US012452760B2

United States Patent
Da Silva et al.

(10) Patent No.: US 12,452,760 B2
(45) Date of Patent: Oct. 21, 2025

(54) HANDLING CONDITIONAL PSCELL CHANGE (CPC) UPON SN RELEASE

(71) Applicant: Telefonaktiebolaget LM Ericsson (publ), Stockholm (SE)

(72) Inventors: Icaro Leonardo J. Da Silva, Solna (SE); Cecilia Eklöf, Täby (SE); Julien Muller, Rennes (FR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 295 days.

(21) Appl. No.: 18/247,900

(22) PCT Filed: Oct. 8, 2021

(86) PCT No.: PCT/IB2021/059244
§ 371 (c)(1),
(2) Date: Apr. 5, 2023

(87) PCT Pub. No.: WO2022/074620
PCT Pub. Date: Apr. 14, 2022

(65) Prior Publication Data
US 2023/0379789 A1 Nov. 23, 2023

Related U.S. Application Data

(60) Provisional application No. 63/089,861, filed on Oct. 9, 2020.

(51) Int. Cl.
*H04W 36/36* (2009.01)
*H04W 36/00* (2009.01)

(52) U.S. Cl.
CPC ... *H04W 36/362* (2023.05); *H04W 36/00698* (2023.05)

(58) Field of Classification Search
CPC ............... H04W 36/362; H04W 36/0069
See application file for complete search history.

(56) References Cited

U.S. PATENT DOCUMENTS

2021/0099926 A1\* 4/2021 Chen ............... H04W 36/362
2021/0337449 A1   10/2021 Zhu et al.

OTHER PUBLICATIONS

PCT International Search Report and Written Opinion mailed Jan. 14, 2022 for International Application No. PCT/IB2021/059244, 11 pages.

(Continued)

*Primary Examiner* — Myron Wyche
(74) *Attorney, Agent, or Firm* — Sage Patent Group

(57) ABSTRACT

Systems and methods are disclosed herein for handling Conditional Primary Secondary Cell (PSCell) Change (CPC) upon Secondary Node (SN) release. In one embodiment, a method performed by a Master Node (MN) for SN release for a User Equipment (UE) that is operating in Multi-Radio Dual Connectivity (MR-DC) and configured with CPC comprises determining that a SN for a UE that is operating in MR-DC and configured with CPC is to be released. The method further comprises, responsive to determining that the SN for the UE that is operating in MR-DC and configured with CPC is to be released, sending a first message to a target SN (T-SN) associated with a CPC configuration for the UE, the first message being indicative of a CPC cancellation, and sending a second message to the UE, the second message comprising an explicit or implicit indication that the UE is to release the CPC configuration.

20 Claims, 23 Drawing Sheets

(56) References Cited

OTHER PUBLICATIONS

CATT, Introduction of Conditional PSCell Change for intra-SN without MN involvement, 3GPP TSG-RAN2 Meeting #109 electronic, R2-2002237 (Revision of R2-2001044), Elbonia, Feb. 24-Mar. 6, 2020, 13 pages.
Ericsson, Remaining issue for conditional PSCell change, 3GPP TSG-RAN WG2 #110, R2-2004620, Electronic meeting, Jun. 1-12, 2020, 4 pages.
Samsung, Summary of Offline Discussion on CB: # 36_MobEnh_CondPSCell_chg, 3GPP TSG-RAN WG3 #108-e, R3-203987, Online, Jun. 1-11, 2020, 9 pages.

* cited by examiner

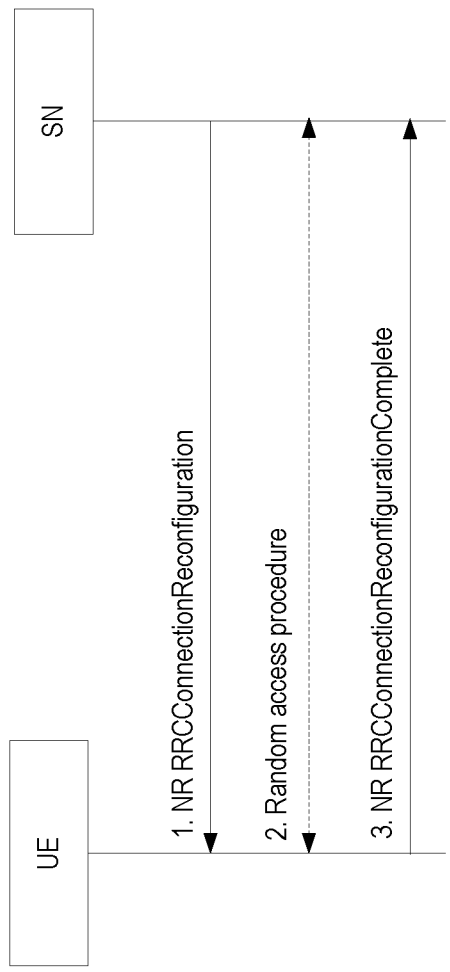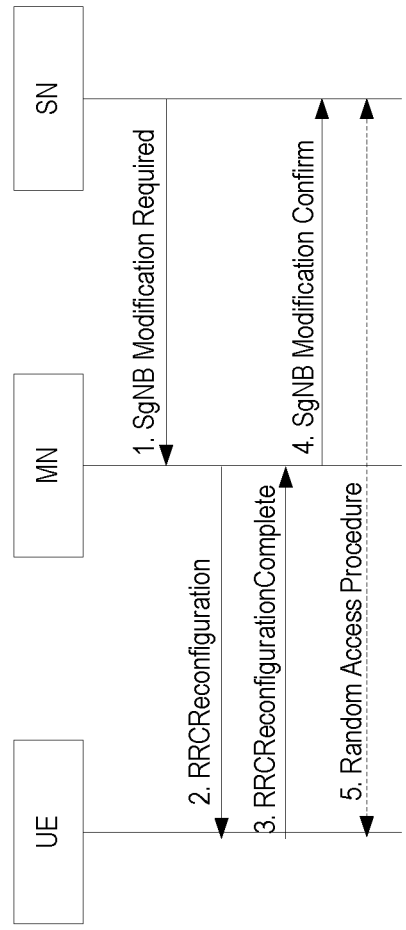
FIG. 7
FIG. 8

HANDLING CONDITIONAL PSCELL CHANGE (CPC) UPON SN RELEASE

RELATED APPLICATIONS

This application is a 35 U.S.C § 371 national stage application for International Application No. PCT/IB2021/059244, entitled "HANDLING CONDITIONAL PSCELL CHANGE (CPC) UPON SN RELEASE", filed on Oct. 8, 2021, which claims the benefit of provisional patent application Ser. No. 63/089,861, filed Oct. 9, 2020, the disclosures of which are hereby incorporated herein by reference in their entireties.

FIELD OF THE DISCLOSURE

The present disclosure relates to dual connectivity in a cellular communications system and, more specifically, to conditional Primary Secondary Cell (PSCell) change (CPC).

BACKGROUND

1 Multi-Radio Dual Connectivity (MR-DC)

Multi-Radio Dual Connectivity (MR-DC) is a generalization of the Intra-Evolved Universal Terrestrial Radio Access (E-UTRA) Dual Connectivity (DC) described in Third Generation Partnership Project (3GPP) Technical Specification (TS) 36.300, where a multiple Receiver (Rx)/Transmitter (Tx) capable User Equipment (UE) may be configured to use resources provided by two different nodes connected via non-ideal backhaul, one providing New Radio (NR) access and the other one providing either E-UTRA or NR access. One node acts as the Master Node (MN) and the other node acts as the Secondary Node (SN). The MN and SN are connected via a network interface and at least the MN is connected to the core network. The MN and/or the SN can be operated with shared spectrum channel access.

1.1 MR-DC With the Evolved Packet Core (EPC)

Evolved Universal Terrestrial Radio Access Network (E-UTRAN) supports MR-DC via E-UTRA-NR Dual Connectivity (EN-DC), in which a UE is connected to one evolved Node B (eNB) that acts as a MN and one EN-DC next generation Node B (en-gNB) that acts as a SN. The eNB is connected to the Evolved Packet Core (EPC) via the S1 interface and to the en-gNB via the X2 interface. The en-gNB might also be connected to the EPC via the S1-U interface and other en-gNBs via the X2-U interface.

The EN-DC architecture is illustrated in FIG. 1.

1.2 MR-DC With the Fifth Generation Core (5GC)

There can be at least three forms of MR-DC with the 5GC:

Next Generation Radio Access Network (NG-RAN) E-UTRA-NR Dual Connectivity (NGEN-DC): NG-RAN supports NGEN-DC, in which a UE is connected to one next generation eNB (ng-eNB) that acts as a MN and one gNB that acts as a SN.

NR-E-UTRA Dual Connectivity (NE-DC): NG-RAN supports, in which a UE is connected to one gNB that acts as a MN and one ng-eNB that acts as a SN.

NR-NR Dual Connectivity (NR-DC): NG-RAN supports NR-DC, in which a UE is connected to one gNB that acts as a MN and another gNB that acts as a SN. In addition, NR-DC can also be used when a UE is connected to two gNB Distributed Units (gNB-DUs), one serving the Master Cell Group (MCG) and the other serving the Secondary Cell Group (SCG), connected to the same gNB Central Unit (gNB-CU), acting both as a MN and as a SN.

1.3 Setting Up MR-DC

The UE can be configured with MR-DC, communicating both via an MCG and an SCG. When the UE is configured with dual connectivity, the UE is configured with two Medium Access Control (MAC) entities: one MAC entity for the MCG and one MAC entity for the SCG. In MR-DC, the cell groups are located in two different logical nodes, i.e. different NG-RAN nodes, possibly connected via a non-ideal backhaul, one providing NR access and the other one providing either E-UTRA or NR access. One node acts as the MN, and the other node acts as the SN. The MN and SN are connected via a network interface and at least the MN is connected to the core network. The operation in MR-DC involves different reconfiguration procedures, like SN addition, SN modification, SN release, and SN change.

The SN Addition procedure is illustrated in FIG. 2. As illustrated, the SN Addition procedure is initiated by the MN and is used to establish a UE context at the SN in order to provide resources from the SN to the UE. For bearers requiring SCG radio resources, this procedure is used to add at least the initial SCG serving cell of the SCG. This procedure can also be used to configure an SN terminated MCG bearer (where no SCG configuration is needed). For details see 3GPP TS 37.340, 3GPP TS 38.423 (for XnAP messages/procedures), and 3GPP TS 38.331 for Radio Resource Control (RRC) messages exchanged between the UE and the network.

2 SN Release Procedure

MR-DC can be configured, e.g., when the network observes an increase in traffic demands that would benefit from the usage of resources from another gNB whose associated cells are in another frequency. However, once the UE is configured with MR-DC, the MN or the SN may determine to release the MR-DC configuration, which is known as an SN Release procedure.

The SN Release procedure may be initiated either by the MN or by the SN and is used to initiate the release of the UE context at the SN. The recipient node of this request can reject it, e.g., if a SN change procedure is triggered by the SN. It does not necessarily need to involve signaling towards the UE, e.g., in case of the RRC connection re-establishment due to Radio Link Failure in the MN.

Examples of MN-initiated and SN-initiated SN Release procedures for EN-DC are shown in FIGS. 3 and 4. Examples of MN-initiated and SN-initiated SN Release procedures for MR-DC are shown in FIGS. 5 and 6, respectively.

2.1 MN Initiated SN Release

As illustrated in FIG. 3, the steps of the MN-initiated SN Release procedure are as follows:

1. The MN initiates the procedure by sending the Secondary gNB (SgNB) Release Request message. If applicable, the MN provides data forwarding addresses to the SN.

2. The SN confirms SN Release by sending the SgNB Release Request Acknowledge message. If appropriate, the SN may reject SN Release, e.g. if the SN change procedure is triggered by the SN.

3/4. If required, the MN indicates in the RRCConnectionReconfiguration message towards the UE that the UE shall release the entire SCG configuration. In case the UE is unable to comply with (part of) the configuration included in the RRCConnectionReconfiguration message, it performs the reconfiguration failure procedure.

NOTE: If data forwarding is applied, timely coordination between steps 1 and 2 may minimize gaps in service provision, this is however regarded to be an implementation matter.

5. For bearers using Radio Link Control (RLC) Acknowledgement Mode (AM), the SN sends the SN Status Transfer.
6. Data forwarding from the SN to the MN may start.
7. The SN sends the Secondary Radio Access Technology (RAT) Data Usage Report message to the MN and includes the data volumes delivered to and received from the UE over the NR radio for the related E-UTRAN Radio Access Bearers (E-RABs).

NOTE: If data forwarding is applied, the order the SN sends the Secondary RAT Data Usage Report message and starts data forwarding with MN is not defined i.e., step 7 can take place before step 6. The SN does not need to wait for the end of data forwarding to send the Secondary RAT Data Usage Report message.

8. If applicable, the path update procedure is initiated.
9. Upon reception of the UE Context Release message, the SN releases radio and Control plane (C-plane) related resources associated to the UE context. Any ongoing data forwarding may continue 2.2 SN Initiated SN Release As illustrated in FIG. 4, the steps of the SN-initiated SN Release procedure are as follows:

1. The SN initiates the procedure by sending the SgNB Release Required message which does not contain inter-node message.
2. If applicable, the MN provides data forwarding addresses to the SN in the SgNB Release Confirm message. The SN may start data forwarding and stop providing user data to the UE as early as it receives the SgNB Release Confirm message.
3/4. If required, the MN indicates in the RRCConnectionReconfiguration message towards the UE that the UE shall release the entire SCG configuration. In case the UE is unable to comply with (part of) the configuration included in the RRCConnectionReconfiguration message, it performs the reconfiguration failure procedure.

NOTE: If data forwarding is applied, timely coordination between steps 2 and 3 may minimize gaps in service provision. This is however regarded to be an implementation matter.

5. For bearers using RLC AM, the SN sends the SN Status Transfer.
6. Data forwarding from the SN to the MN may start.
7. The SN sends the Secondary RAT Data Usage Report message to the MN and includes the data volumes delivered to and received from the UE over the NR radio for the related E-RABs.

NOTE: If data forwarding is applied, the order the SN sends the Secondary RAT Data Usage Report message and starts data forwarding with MN is not defined i.e., step 7 can take place before step 6. The SN does not need to wait for the end of data forwarding to send the Secondary RAT Data Usage Report message.

8. If applicable, the path update procedure is initiated.
9. Upon reception of the UE Context Release message, the SN releases radio and C-plane related resources associated to the UE context. Any ongoing data forwarding may continue.

2.3 MN Initiated SN Release (MR-DC)

FIG. 5 illustrates the MN-initiated SN release procedure for MR-DC. While the details of this procedure are known, the interested reader is directed to 3GPP TS 37.340, Section 10.4.

2.4 SN Initiated SN Release

FIG. 6 illustrates the SN-initiated SN release procedure for MR-DC. While the details of this procedure are known, the interested reader is directed to 3GPP TS 37.340, Section 10.4.

3 Conditional Primary Secondary Cell (PSCell) Change Rel-16

In Rel-16, Conditional PSCell Change (CPC) has been standardized. CPC is defined as a PSCell change that is executed by the UE when an execution condition(s) is met. The UE starts evaluating the execution condition(s) upon receiving the CPC configuration and stops evaluating the execution condition(s) once PSCell change is triggered. Only intra-SN CPC is supported.

Certain principles apply to CPC. For example, the CPC configuration contains the configuration of CPC candidate cell(s) and execution condition(s) generated by the SN. Further, an execution condition may consist of one or two trigger condition(s) (CPC events A3/A5, as defined in RRC specifications). Only single Reference Signal (RS) type is supported and at most two different trigger quantities (e.g., Reference Signal Received Power (RSRP) and Reference Signal Received Quality (RSRQ), RSRP and Signal to Interference plus Noise Ratio (SINR), etc.) can be configured simultaneously for the evaluation of CPC execution condition of a single candidate PSCell. In addition, before any CPC execution condition is satisfied, upon reception of PSCell change command or Primary Cell (PCell) change command, the UE executes the PSCell change procedure or the PCell change procedure, regardless of any previously received CPC configuration. Upon the successful completion of PSCell change procedure or PCell change procedure, the UE releases all stored CPC configurations. Further, while executing CPC, the UE is not required to continue evaluating the execution condition of other candidate PSCell(s). In addition, once the CPC procedure is executed successfully, the UE releases all stored CPC configurations. Further, upon the release of SCG, the UE releases the stored CPC configurations.

CPC configuration in Handover (HO) command, PSCell change command, or CPC configuration is not supported.

In Rel-16, CPC was limited to intra-node CPC, i.e., for a UE configured with MR-DC, the SN determines to configure CPC and provides a CPC configuration to the UE (e.g., via the MN), but the target candidate PSCell is a cell that is also associated with the same SN, i.e. both source PSCell and target candidate PSCell(s) are associated to the Source SN. Also, only an SN-initiated CPC with or without MN involvement is supported.

3.1 SN Initiated SN Modification Without MN Involvement

FIG. 7 illustrates SN-initiated SN modification without MN involvement. In this case, CPC is configured at the UE by modifying the SCG configuration via Signaling Radio Bearer (SRB) 3 (SRB3), so the SN initiated modification without MN involved procedure is used, as shown in FIG. 7. The SN can decide whether the Random Access procedure is required. The steps of the procedure of FIG. 7 are as follows:

1. The SN sends the RRCReconfiguration message to the UE through SRB3. The UE applies the new configuration. For CPC that contains the Information Element (IE) ConditionalReconfiguration, which is part of the SCG Configuration and includes an RRCReconfiguration to be stored, per target candidate PSCell, and a condition configuration (on or two measId(s) pointing to a measurement configuration).

[ . . . ]

3a. In case of CPC, the UE maintains connection with source PSCell after receiving CPC configuration, and starts evaluating the CPC execution conditions for candidate PSCell(s). If at least one CPC candidate PSCell satisfies the corresponding CPC execution condition, the UE detaches from the source PSCell, applies the stored corresponding configuration for the selected candidate PSCell, and synchronizes to that candidate PSCell. The UE completes the CPC execution procedure by sending an RRCReconfigurationComplete message to the new PSCell if the SRB3 is configured.

3.2 Transfer of an NR RRC Message to/from the UE (When SRB3 is Not Used)

FIG. 8 illustrates a procedure for transfer of an NR RRC message to/from the UE. This procedure is used in case SRB3 is not configured. The SN initiates the procedure when it needs to transfer an NR RRC message to the UE and SRB3 is not used; and, in this particular case, the configuration contains an NR SCG RRCReconfiguration including the IE ConditionalReconfiguration, which is part of the SCG Configuration and includes an RRCReconfiguration to be stored, per target candidate PSCell, and a condition configuration (on or two measId(s) pointing to a measurement configuration). The steps of the procedure of FIG. 8 are as follows:

1. The SN initiates the procedure by sending the SgNB Modification Required to the MN.
2. The MN forwards the NR RRC message to the UE in the RRCConnectionReconfiguration message.
3. The UE applies the new configuration and replies with the RRCConnectionReconfigurationComplete message.
3a. If CPC is configured in the RRCConnectionReconfiguration, the UE maintains the connection with source PSCell after receiving the CPC configuration, and starts evaluating the CPC execution conditions for candidate PSCell(s). If at least one CPC candidate PSCell satisfies the corresponding CPC execution condition, the UE detaches from the source PSCell, applies the stored corresponding configuration for the selected candidate PSCell and synchronizes to that candidate PSCell. The UE completes the CPC execution procedure by sending an ULInformationTransferMRDC message to the MN which includes an embedded RRCReconfigurationComplete message to the new PSCell.
4. The MN forwards the NR RRC response message, if received from the UE, to the SN in the SgNB Modification Confirm message.
5. If instructed, the UE performs synchronization towards the PSCell of the SN as described in SgNB Addition procedure. Otherwise, the UE may perform uplink transmission after having applied the new configuration.

SUMMARY

Systems and methods are disclosed herein for handling Conditional Primary Secondary Cell (PSCell) Change (CPC) upon Secondary Node (SN) release. In one embodiment, a method performed by a Master Node (MN) for SN release for a User Equipment (UE) that is operating in Multi-Radio Dual Connectivity (MR-DC) and configured with CPC comprises determining that a SN for a UE that is operating in MR-DC and configured with CPC is to be released. The method further comprises, responsive to determining that the SN for the UE that is operating in MR-DC and configured with CPC is to be released, sending a first message to a target SN (T-SN) associated with a CPC configuration for the UE, the first message being indicative of a CPC cancellation, and sending a second message to the UE, the second message comprising an explicit or implicit indication that the UE is to release the CPC configuration. In this manner, the candidate T-SN is preventing from indefinitely keeping the CPC configuration stored and keeping resources associated to the CPC reserved, even though the SN release has been performed.

In one embodiment, determining that the SN for the UE that is operating in MR-DC and configured with CPC is to be released comprises determining, by the MN, to release the SN node for the UE that is operating in MR-DC and configured with CPC.

In one embodiment, determining that the SN for the UE that is operating in MR-DC and configured with CPC is to be released comprises receiving a request to release the SN node for the UE that is operating in MR-DC and configured with CPC.

In one embodiment, the method further comprises, responsive to determining that the SN for the UE that is operating in MR-DC and configured with CPC is to be released, determining whether a CPC cancellation procedure towards a target T-SN associated with the CPC configuration of the UE is to be performed. Further, sending the first message and sending the second message are performed responsive to determining that the SN for the UE that is operating in MR-DC and configured with CPC is to be released and determining that the CPC cancellation procedure towards the T-SN associated with the CPC configuration of the UE is to be performed. In one embodiment, determining whether a CPC cancellation procedure towards a T-SN associated with the CPC configuration of the UE is to be performed comprises determining whether the UE is configured with CPC and whether a target candidate PSCell is associated with a same network node as the SN being released or with a different network node than the SN being released. In another embodiment, determining whether a CPC cancellation procedure towards a T-SN associated with the CPC configuration of the UE is to be performed further comprises determining that the CPC cancellation procedure towards the T-SN is to be performed responsive to determining that the UE is configured with CPC and the target candidate PSCell is associated with a different network node than the SN being released.

In one embodiment, sending the first message to the T-SN comprises sending the first message to the T-SN prior to sending a SN release request to the SN being released.

In one embodiment, sending the first message to the T-SN comprises sending the first message to the T-SN subsequent to sending a SN release request to the SN being released.

In one embodiment, the first message is a new CPC cancel message. In another embodiment, the first message is a SN release request or a SN modification request.

In one embodiment, the first message comprises a cause value that indicates that a cause of the first message is an SN release.

In one embodiment, the second message is a Radio Resource Control (RRC) reconfiguration message. In one embodiment, the CPC configuration of the UE is a SN-generated CPC configuration, and the RRC reconfiguration message comprises field mrdc-SecondaryCellGroupConfig set to release. In another embodiment, the CPC configuration of the UE is a MN-generated CPC configuration, and release of the CPC configuration at the UE also results in release of one or more measurement objects that are only associated to the CPC configuration being released. In another embodiment, the CPC configuration of the UE is a MN-generated CPC configuration, and the RRC reconfiguration message comprises a list of conditional reconfigurations to remove that comprises an indication of the CPC configuration being released.

Corresponding embodiments of a MN are also disclosed. In one embodiment, a MN for SN release for a UE that is operating in MR-DC and configured with CPC is adapted to determine that a SN for a UE that is operating in MR-DC and configured with CPC is to be released. The MN is further adapted to, responsive to determining that the SN for the UE that is operating in MR-DC and configured with CPC is to be released, send a first message to a T-SN associated with a CPC configuration for the UE, the first message being indicative of a CPC cancellation, and send a second message to the UE, the second message comprising an explicit or implicit indication that the UE is to release the CPC configuration.

In one embodiment, a network node for implementing a MN for SN release for a UE that is operating in MR-DC and configured with CPC comprises processing circuitry configured to cause the network node to determine that a SN for a UE that is operating in MR-DC and configured with CPC is to be released. The processing circuitry is further configured to cause the network node to, responsive to determining that the SN for the UE that is operating in MR-DC and configured with CPC is to be released, send a first message to a T-SN associated with a CPC configuration for the UE, the first message being indicative of a CPC cancellation, and send a second message to the UE, the second message comprising an explicit or implicit indication that the UE is to release the CPC configuration.

Embodiments of a method performed by a candidate target SN, T-SN, for CPC for a UE that is operating in MR-DC and configured with CPC are also disclosed. In one embodiment, the method performed by the candidate T-SN comprises receiving, from a MN of a UE that is operating in MR-DC and configured with CPC, a first message that is indicative of a CPC cancellation for CPC for the UE. The method further comprises releasing a CPC configuration for the UE at the candidate T-SN responsive to receiving the first message.

In one embodiment, the first message is a new CPC cancel message. In another embodiment, the first message is a SN release request or a SN modification request.

In one embodiment, the first message comprises a cause value that indicates that a cause of the first message is an SN release.

Corresponding embodiments of a candidate T-SN for CPC for a UE that is operating in MR-DC and configured with CPC are also disclosed. In one embodiment, a candidate T-SN is adapted to receive, from a MN of a UE that is operating in MR-DC and configured with CPC, a first message that is indicative of a CPC cancellation for CPC for the UE. The candidate T-SN is further adapted to release a CPC configuration for the UE at the candidate T-SN responsive to receiving the first message.

In another embodiment, a network node for implementing a candidate T-SN for CPC for a UE that is operating in MR-DC and configured with CPC comprises processing circuitry configured to cause the network node to receive, from a MN of a UE that is operating in MR-DC and configured with CPC, a first message that is indicative of a CPC cancellation for CPC for the UE. The processing circuitry is further configured to cause the network node to release a CPC configuration for the UE at the candidate T-SN responsive to receiving the first message.

Embodiments of a method performed by a UE that is operating in MR-DC are also disclosed. In one embodiment, the method comprises obtaining a CPC configuration, monitoring for an occurrence of one or more conditions defined for the CPC configuration, and receiving, from a MN, a message that implicitly or explicitly indicates that the CPC configuration is to be released. The message that implicitly or explicitly indicates that the CPC configuration is to be released is received in association with a release of a SN of the UE.

In one embodiment, the message is an RRC reconfiguration message. In one embodiment, the CPC configuration of the UE is a SN generated CPC configuration, and the RRC reconfiguration message comprises field mrdc-SecondaryCellGroupConfig set to release. In another embodiment, the CPC configuration of the UE is a MN-generated CPC configuration, and release of the CPC configuration at the UE also results in release of one or more measurement objects that are only associated to the CPC configuration being released. In another embodiment, the CPC configuration of the UE is a MN-generated CPC configuration, and the RRC reconfiguration message comprises a list of conditional reconfigurations to remove that comprises an indication of the CPC configuration being released.

Corresponding embodiments of a UE that is operating in MR-DC are also disclosed. IN one embodiment, the UE is adapted to obtain a CPC configuration, monitor for an occurrence of one or more conditions defined for the CPC configuration, and receive, from a MN, a message that implicitly or explicitly indicates that the CPC configuration is to be released. The message that implicitly or explicitly indicates that the CPC configuration is to be released is received in association with a release of a SN of the UE.

In another embodiment, a UE that is operating in MR-DC comprise radio front end circuitry and processing circuitry associated with the radio front end circuitry. The processing circuitry is configured to cause the UE to obtain a CPC configuration, monitor for an occurrence of one or more conditions defined for the CPC configuration, and receive, from a MN, a message that implicitly or explicitly indicates that the CPC configuration is to be released. The message that implicitly or explicitly indicates that the CPC configuration is to be released is received in association with a release of a SN of the UE.

BRIEF DESCRIPTION OF THE DRAWINGS

FIG. 7 illustrates a procedure for SN-initiated SN modification without MN involvement;

FIG. 8 illustrates a procedure for transfer of a New Radio (NR) Radio Resource Control (RRC) message to/from a User Equipment (UE) when Service Radio Bearer 3 (SRB3) is not used;

DETAILED DESCRIPTION

Figure 1:
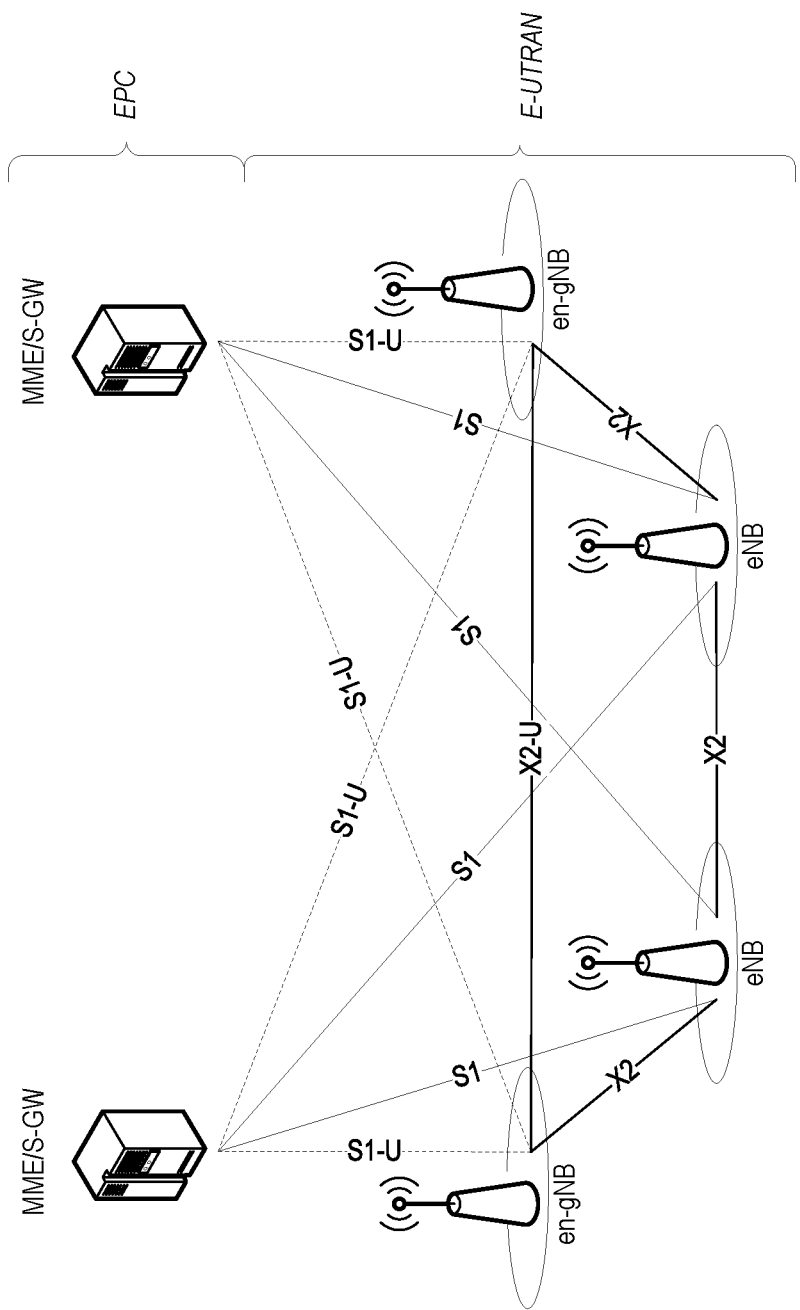
FIG. 1 illustrates the Evolved Universal Terrestrial Radio Access (E-UTRA)—New Radio (NR) Dual Connectivity (EN-DC) architecture defined by the Third Generation Partnership Project (3GPP) standards.
Figure 2:
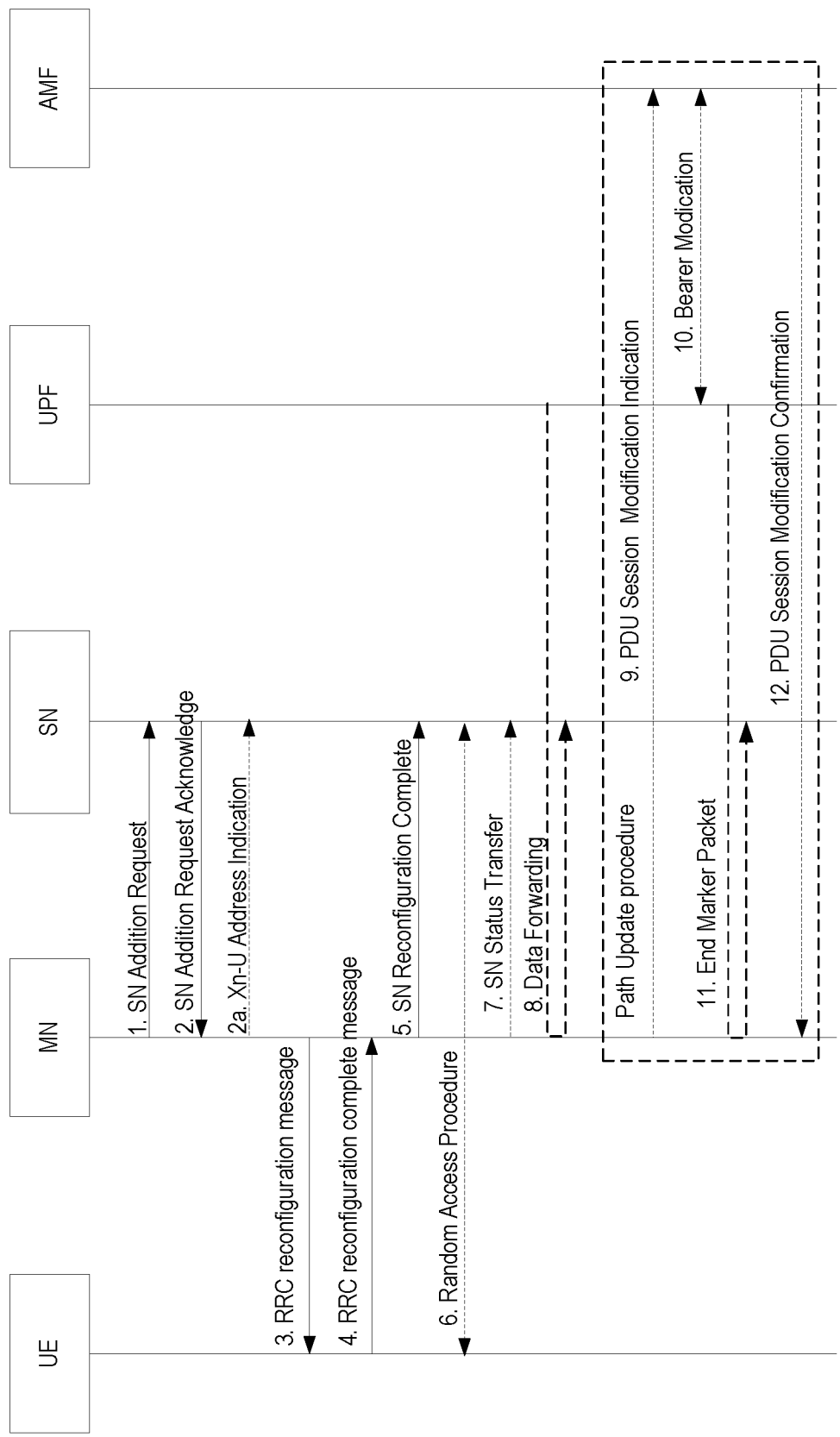
FIG. 2 illustrates a Secondary Node (SN) Addition procedure.
Figure 3:
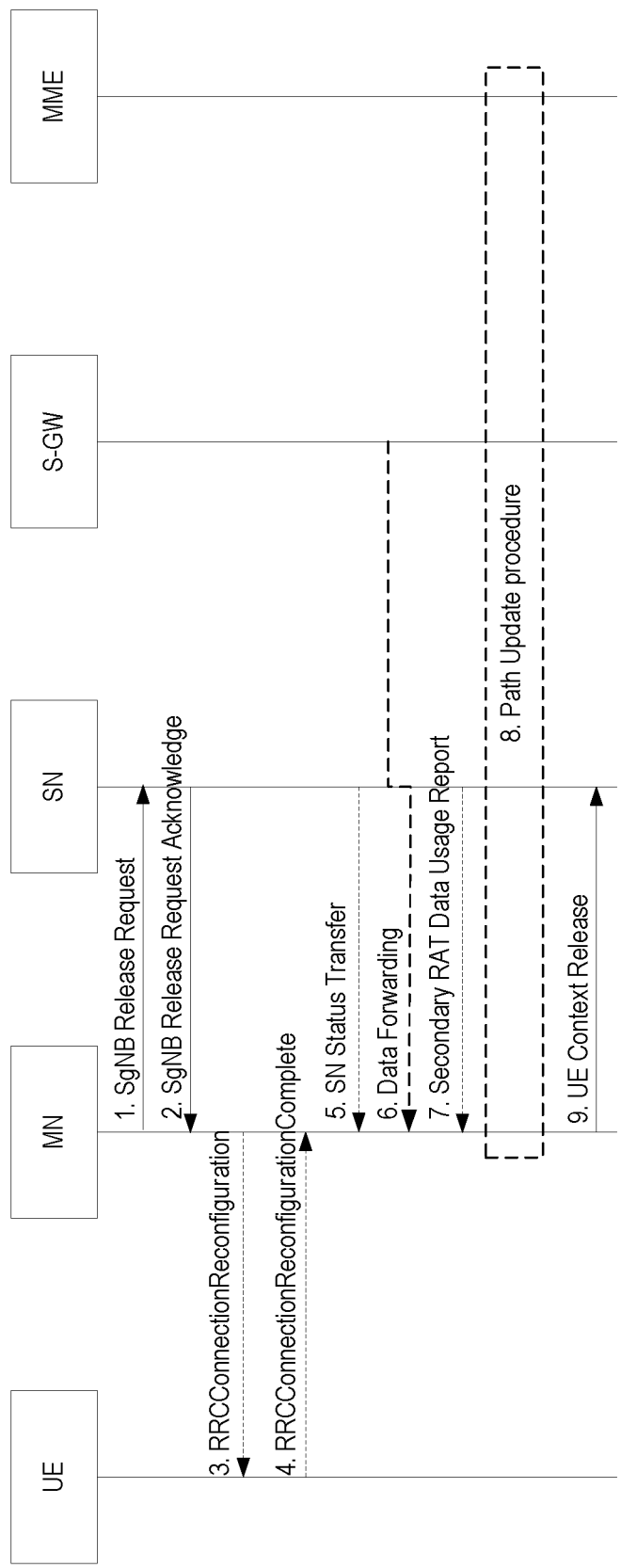
FIG. 3 illustrates the Master Node (MN) initiated SN Release procedure for EN-DC.
Figure 4:
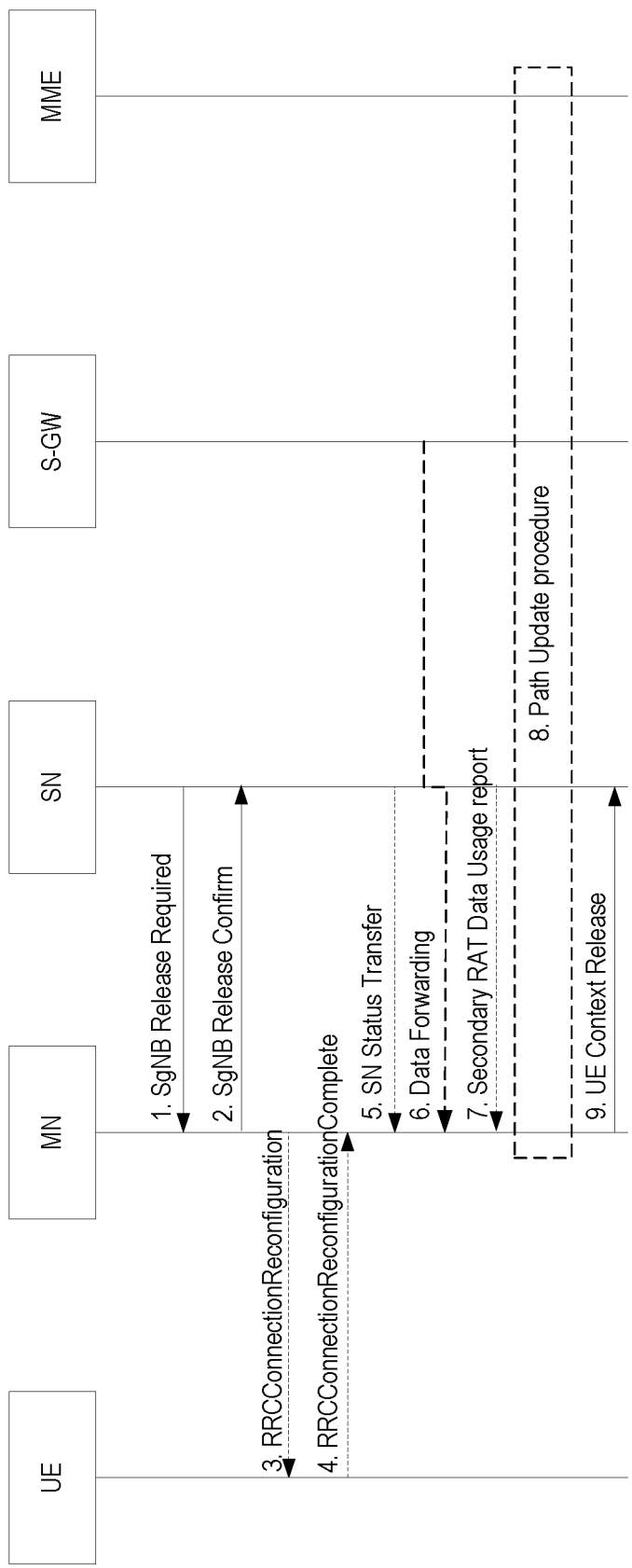
FIG. 4 illustrates the SN-initiated SN Release procedure for EN-DC.
Figure 5:
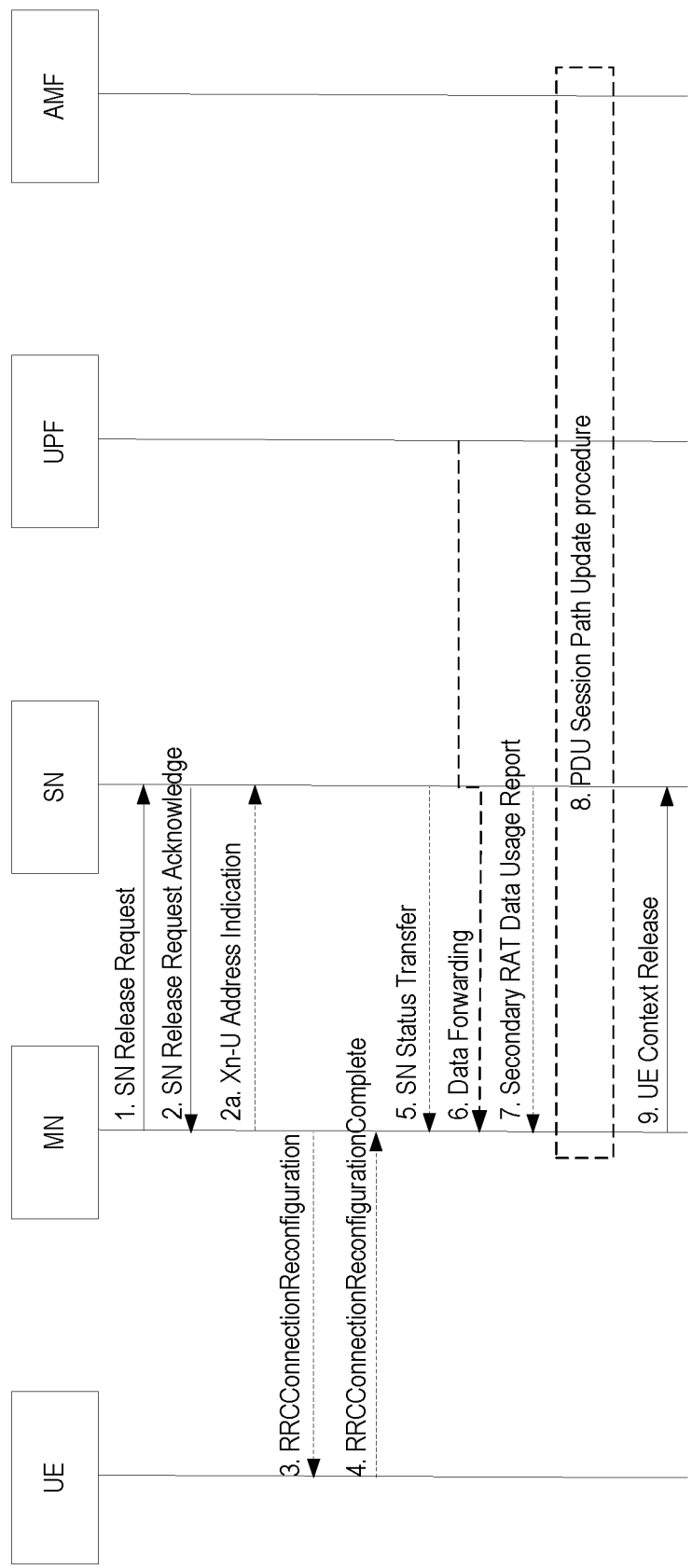
FIG. 5 illustrates the MN-initiated SN release procedure for Multi-Radio Dual Connectivity (MR-DC)
Figure 6:
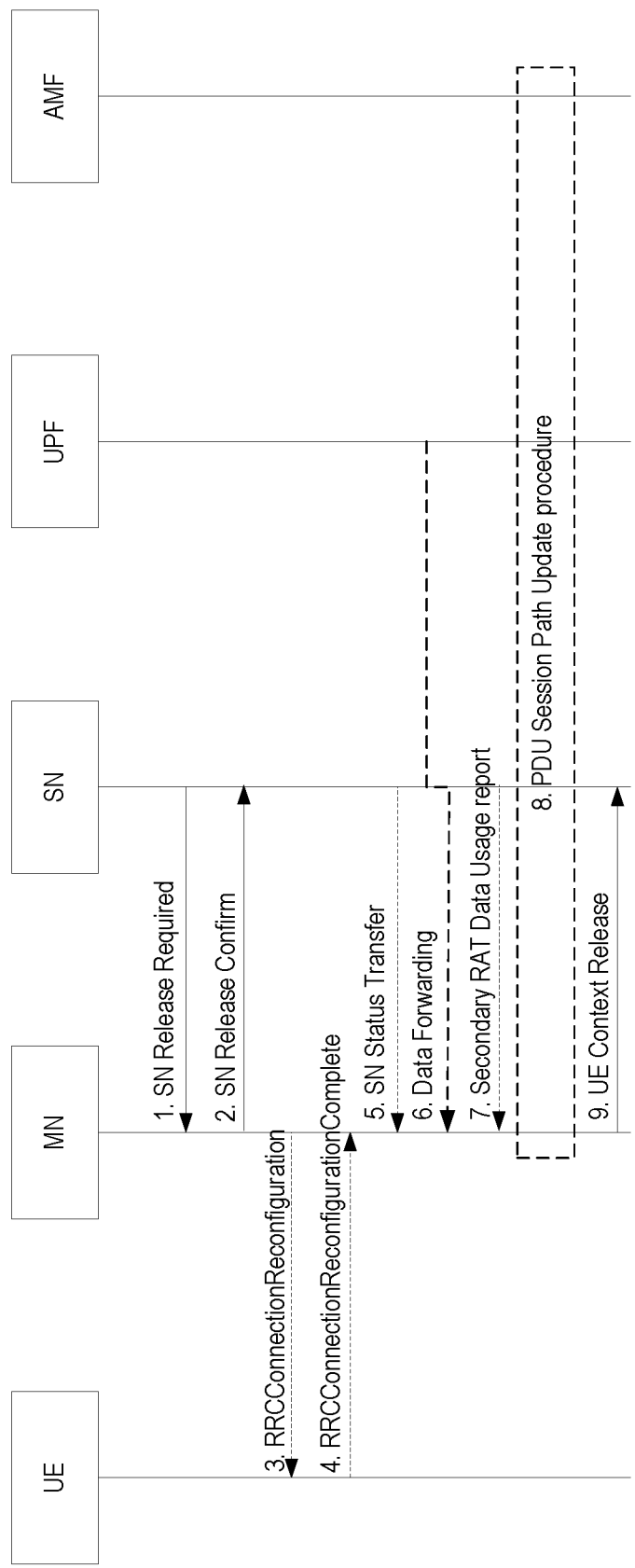
FIG. 6 illustrates the SN-initiated SN release procedure for MR-DC.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

1 Problems With Existing Solutions

There currently exist certain challenges. A problem that embodiments of the present disclosure address originates from the following scenario to be supported in Third Generation Partnership Project (3GPP) Rel-17. This occurs when a UE is operating in Multi-Radio Dual Connectivity (MR-DC). That is, where the UE has a connection with a Master Node (MN) and a Secondary Node (SN) and the UE is configured with an inter-SN, MN initiated or SN initiated Conditional PSCell Change (CPC), i.e., when at least one target candidate Primary Secondary Cell (PSCell) in CPC is associated with a target candidate SN (T-SN) that is not the same node as the source SN (S-SN) the UE is connected to. In the existing 3GPP standard, there is no signalling and associated procedures supporting inter-SN, MN initiated CPC.

The Rel-17 Work Item Description (see RP-201040) describes the following objectives:

1. Support efficient activation/de-activation mechanism for one SCG and SCells

[ . . . ]

2. Support of conditional PSCell change/addition [RAN2, RAN3, RAN4]

support scenarios which are not addressed in Rel-16 NR mobility WI

In the first meeting, the topic was discussed (RAN2 #111-e) and the following has been agreed:

R2 assumes that the work will follow what is in the WID, and initially focus on CPA and Inter-SN CPC The present disclosure identifies and focuses on the problems of the actions on the network (e.g., MN, source SN, and target candidate SN(s)) when the SN needs to be released (e.g., when it is SN-initiated SN Release or MN-initiated SN-release) and the UE is configured with CPC.

Using existing SN Release procedures, if applied, target candidates could indefinitely (i.e., during an indefinite amount of time) keep CPC configurations stored and keep resources associated with CPC reserved, even though the SN release procedure has been finalized between the MN and the Source SN (i.e., the source SN may have possibly received a UE context release message). And, even if the target candidate SN(s) may possibly define a timer for which it keeps resources, the expiry may lead to the target candidate SN(s) to possibly send message(s) to the MN, which may lead to a lot of signaling in the inter-node interfaces from target candidates to the MN. Another problem, this time on the UE side, is that if the CPC configuration is an MN-generated configuration, an SN release that follows an SCG configuration release would not lead to the release of CPC at the UE upon SN release i.e., the UE may still have CPC configuration(s) being monitored unnecessarily, once it does not have a source SN any longer (i.e., UE is not even configured with MR-DC any more).

2 Summary of Certain Aspects of the Present Disclosure

Certain aspects of the present disclosure and their embodiments may provide solutions to these or other challenges. Embodiments of the disclosure include the following methods: (1) a MN-initiated SN Release procedure where both the MN and SN serve a UE configured with MR-DC, and where the UE is configured with CPC i.e. it has stored a configuration associated to a target candidate SN (candidate T-SN); and (2) a SN-initiated SN Release procedure where both the MN and SN serve a UE configured with MR-DC, and where the UE is configured with CPC i.e. it has stored a configuration associated to a target candidate SN (candidate T-SN).

2.1 MN-Initiated SN Release for UE With CPC

According to one embodiment, a method at a first network node operating as a MN is disclosed. The method includes determining to release a SN for a UE operating in MR-DC and configured with CPC, transmitting an SN Node Release Request Message to the Source SN (S-SN), receiving an SN Node Release Request Acknowledge Message from the S-SN, determining whether it triggers or not a CPC cancel procedure towards a target candidate SN (T-SN) associated with a CPC configuration, and determining whether to explicitly or implicitly indicate to the UE that CPC is to be removed.

In the above method, if the UE is configured with CPC and a configured target candidate PSCell is associated with another network node (e.g., a target candidate SN that is not the same as the S-SN), the MN triggers a CPC cancel procedure towards a target candidate SN (T-SN) associated with a CPC configuration (e.g., transmit a "CPC Cancel" message or any other message indicating the target candidate SN that CPC is being cancelled, possibly including a cause value e.g., 'SN release').

In the above method, if the UE is configured with CPC and a configured target candidate PSCell is associated with the same network node (e.g., a target candidate SN that is the same as the S-SN), the MN refrains from triggering a CPC cancel procedure (e.g., refrains from transmitting a "CPC Cancel" message or any other message indicating the target candidate SN that CPC is being cancelled, possibly including a cause value e.g., 'SN release'.

In the above method, if the CPC is an MN-related or Master Cell Group (MCG) configuration (i.e., configured as part of an MN/MCG configuration), and the MN has triggered a cancel procedure towards a target candidate SN, the MN generates an RRCReconfiguration message releasing CPC. An "MN-related or MCG configuration" is a configuration received in a Radio Resource Control (RRC) message generated by the MN, and not received within a container for a Secondary Cell Group (SCG) configuration e.g., not within the field nr-scg as defined in 3GPP TS 38.331.

In the above method, if CPC is an SN-related/SCG configuration (i.e., configured as part of an SN/SCG configuration), and the MN has triggered a cancel procedure towards a target candidate SN, the MN generates an RRCReconfiguration message including an indication for the SCG release, which implicitly indicates to the UE that the UE shall release CPC (as CPC is an SCG configuration in this case). An "SN-related or SCG configuration" is a configuration received in an RRC message generated by the SN, and/or received within a container for an SCG configuration e.g., within the field nr-scg as defined in 3GPP TS 38.331.

According to another embodiment, a method at a second network node operating as a S-SN is disclosed. The method includes receiving an SN Node Release Request Message from the MN and transmitting an SN Node Release Request Acknowledge message to the MN.

2.2 SN-Initiated SN Release for UE With CPC

According to another embodiment, a method at a third network node operating as a S-SN is disclosed. The method includes determining to release the SN for a UE operating in MR-DC and configured with CPC, transmitting an SN Node Release Required message to the MN, and receiving an SN Node Release Confirm message from the MN.

According to another embodiment, a method at a further network node operating as a MN is disclosed. The method includes receiving an SN node release required message from the S-SN, transmitting an SN node release confirm message to the S-SN, determining whether it triggers or not a CPC cancel procedure towards a T-SN associated with a CPC configuration, and determining whether to explicitly indicate to the UE that CPC is to be removed. If the UE is configured with CPC and a configured target candidate PSCell is associated to another network node (e.g., a T-SN that is not the same as the S-SN), the MN triggers a CPC cancel procedure towards a T-SN associated with a CPC configuration (e.g., transmit a "CPC Cancel" message or any other message indicating the T-SN that CPC is being cancelled, possibly including a cause value e.g., 'SN release').

If the UE is configured with CPC and a configured target candidate PSCell is associated with the same network node (e.g., a T-SN that is the same as the S-SN), the MN refrain from triggering a CPC cancel procedure (e.g., refrain from transmitting a "CPC Cancel" message or any other message indicating the T-SN that CPC is being cancelled, possibly including a cause value e.g. 'SN release'). If CPC is an MN-related or MCG configuration (i.e., configured as part of an MN/MCG configuration), and the MN has triggered a cancel procedure towards a target candidate SN, the MN generates an RRCReconfiguration message releasing CPC. An "MN-related or MCG configuration" is a configuration received in an RRC message generated by the MN and not received within a container for an SCG configuration, e.g. not within the field nr-scg as defined in 3GPP TS 38.331. If CPC is an SN-related/SCG configuration (i.e., configured as part of an SN/SCG configuration), and the MN has triggered a cancel procedure towards a target candidate SN, the MN generates an RRCReconfiguration message including an indication for the SCG release, which implicitly indicates to the UE that the UE shall release CPC (as CPC is an SCG configuration in this case). An "SN-related or SCG configuration" is a configuration received in an RRC message generated by the SN and/or received within a container for an SCG configuration, e.g. within the field nr-scg as defined in 3GPP TS 38.331.

2.3 Advantages

Certain embodiments may provide one or more of the following technical advantage(s). Certain embodiments prevent the target candidate (candidate target SN, T-SN) to indefinitely (i.e., during an indefinite amount of time) keep CPC configurations stored and keep resources associated to CPC reserved, even though the SN release procedure has been finalized between the MN and the Source SN (i.e., the source SN may have possibly received a UE context release message). That is done due to the cancelling procedures the MN executes towards the target candidate upon SN release (either MN-initiated SN release or SN-initiated MN release).

Certain embodiments may also prevent the case where the expiry of a timer controlling for how long a target candidate SN keep CPC configurations and associated resources, lead to the target candidate SN(s) to possibly send message(s) to the MN; in other words, the method prevents a lot of signaling in the inter-node interfaces from target candidates to the MN.

Certain embodiments may also prevent the problem if the CPC configuration is an MN-generated configuration, an SN release that follows an SCG configuration release would not lead to the release of CPC at the UE upon SN release, i.e., the UE may still have CPC configurations being monitored unnecessarily, once it does not have a source SN any longer (i.e., UE is not even configured with MR-DC any more).

3 Details of Certain Embodiments of the Present Disclosure

3.1 Initial Discussion

The present disclosure refers to a UE operating in MR-DC according to the NR specifications, e.g. 3GPP TS 37.340, TS 38.331, etc. The disclosure refers to a first network node operating as a MN, e.g. having a MCG configured to the UE and/or an MN-terminated bearer; that MN can be a gNB, or a Central Unit gNB (CU-gNB), or an eNB, or a Central Unit eNB (CU-gNB), or any network node and/or network function. The disclosure also refers to a second network node operating as a SN, or Source Secondary Node (S-SN) e.g. having a SCG configured to the UE and/or an SN-terminated bearer; that SN can be a gNB, or a CU-gNB, or an eNB, or a CU-eNB, or any network node and/or network function. Notice that MN, S-SN and T-SN may be from the same or different Radio Access Technologies (RATs) and possibly be associated to different Core Network nodes.

The present disclosure refers to a target candidate SN, or target SN (T-SN) candidate, as the network node (e.g., gNB) that is prepared during the CPC procedure and that creates an RRC Reconfiguration message with an SCG configuration to be provided to the UE and stored, with an execution condition, wherein the UE only applies the message upon the fulfilment of the execution condition. That target candidate SN is associated to one or multiple target candidate cell(s) that the UE can be configured with. The UE then can execute the condition and accesses one of these target candidate cells, associated to a target candidate SN that becomes the target SN after execution (i.e., upon fulfilment of the execution condition).

The present disclosure refers to a Conditional PSCell Change (CPC) and procedures (like CPC execution). Other terms may be considered as synonyms such as conditional reconfiguration, or Conditional Configuration (since the message that is stored and applied upon fulfilment of a condition is an RRCReconfiguration or RRCConnectionReconfiguration). Terminology wise, one could also interpret conditional handover (CHO) in a broader sense, also covering CPC (Conditional PSCell Change) or CPAC (Conditional PSCell Addition/Change) procedures.

The configuration of CPC can be done using the same Information Elements (IEs) as conditional handover, which may be called at some point conditional configuration or conditional reconfiguration. The principle for the configuration is the same with configuring triggering/execution condition(s) and a reconfiguration message to be applied when the triggering condition(s) are fulfilled. The configuration IEs from 3GPP TS 38.331 are as follows:

Configuration IEs from TS 38.331

ConditionalReconfiguration

The IE ConditionalReconfiguration is used to add, modify and release the configuration of conditional configuration.

ConditionalReconfiguration Information Element

```
-- ASN1START
-- TAG-CONDITIONALRECONFIGURATION-START
ConditionalReconfiguration-r16 ::=    SEQUENCE {
    attemptCcondReconfig-r16          ENUMERATED {true}          OPTIONAL,   -- Need N
    condConfigToRemoveList-r16        CondConfigToRemoveList-r16     OPTIONAL,   -- Need N
    condConfigToAddModList-r16        CondConfigToAddModList-r16     OPTIONAL,   -- Need N
    ...
}
CondConfigToRemoveList-r16 ::= SEQUENCE (Size (1.. maxNrofCondCells)) OF CondConfigId-r16
-- TAG-CONDITIONALRECONFIGURATION-STOP
-- ASN1STOP
```

ConditionalReconfiguration field descriptions condConfigToAddModList
List of the configuration of candidate SpCells to be added or modified for CHO or CPC.
condConfigToRemoveList
List of the configuration of candidate SpCells to be removed. When the network removes the stored conditional configuration for a candidate cell, the network releases the measIDs associated to the condExecutionCond if it is not used by the condExecutionCond of other candidate cells.

CondConfigId

The IE CondConfigId is used to identify a CHO or CPC configuration.

CondConfigId Information Element

```
-- ASN1START
-- TAG-CONDCONFIGID-START
CondConfigId-r16 ::=       INTEGER (1.. maxNrofCond-Cells)
-- TAG-CONDCONFIGID-STOP
-- ASN1STOP
```

CondConfigToAddModList

The IE CHO-ConfigToAddModList concerns a list of conditional configurations to add or modify, with for each entry the cho-ConfigId and the associated condExecutionCond and condRRCReconfig.

CondConfigToAddModList Information Element

```
-- ASN1START
-- TAG-CONDCONFIGTOADDMODLIST-START
CondConfigToAddModList-r16 : :=    SEQUENCE (Size (1. . maxNrofCondCells)) OF
CondConfigToAddMod-r16
CondConfigToAddMod-r16 : :=      SEQUENCE {
    condConfigId-r16                         CondConfigId-r16,
    condExecutionCond-r16                    SEQUENCE (Size (1. .2)) OF MeasId OPTIONAL,
-- Need S
    condRRCReconfig-r16                      OCTET STRING (CONTAINING RRCReconfiguration)
OPTIONAL,       -- Need S
    . . .
}
-- TAG-CONDCONFIGTOADDMODLIST-STOP
-- ASN1STOP
```

CondConfigToAddMod field descriptions condExecutionCond
The execution condition that needs to be fulfilled in order to trigger the execution of a conditional configuration. The field is mandatory present when a condConfigId is being added. Otherwise, when the condRRCReconfig associated to a condConfigId is being modified it is optionally present and the UE uses the stored value if the field is absent.
condRRCReconfig
The RRCReconfiguration message to be applied when the condition(s) are fulfilled. The field is mandatory present when a condConfigId is being added. Otherwise, when the condExecutionCond associated to a condConfigId is being modified it is optionally present and the UE uses the stored value if the field is absent.

End Configuration IEs from TS 38.331

As used herein, the terms handover, reconfigurationWithSync, PSCell change are used in the same context The present disclosure also mentions sometimes "a CPC cancel procedure" between MN and target candidate SN. However, it could be equivalently said that, from the MN's perspective the step the MN performs towards a target candidate SN is a Conditional PSCell Addition (CPA) cancel procedure, in the sense that the MN has previously configured a conditional SN Addition.

3.2 Solutions for CPC Configuration and Execution

There may be different ways to realize the CPC configuration between MN, S-SN, and a target candidate, in terms of which node generates the CPC configuration (e.g., MN-generated CPC or SN-generated CPC) and which node initiates the CPC procedure (MN-initiated, SN-initiated).

3.2.1 SN-Initiated CPC

For SN-initiated CPC, at least one of the following two solutions may be used.

Figure 9A:
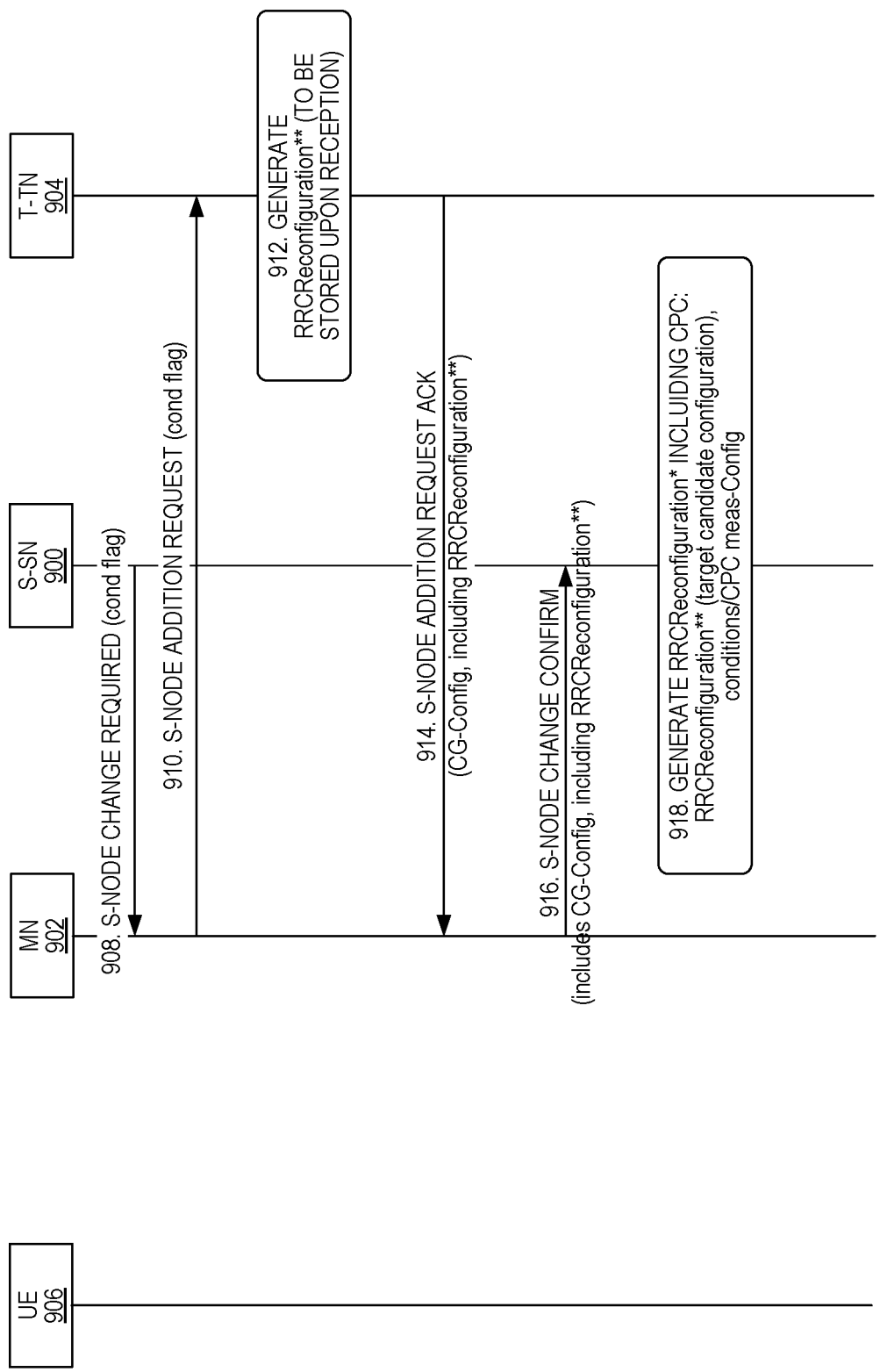
FIGS. 9A and 9B illustrate a procedure for SN-initiated Conditional Primary Secondary Cell (PSCell) Change (CPC) for SN-generated CPC configuration.
Figure 9B:
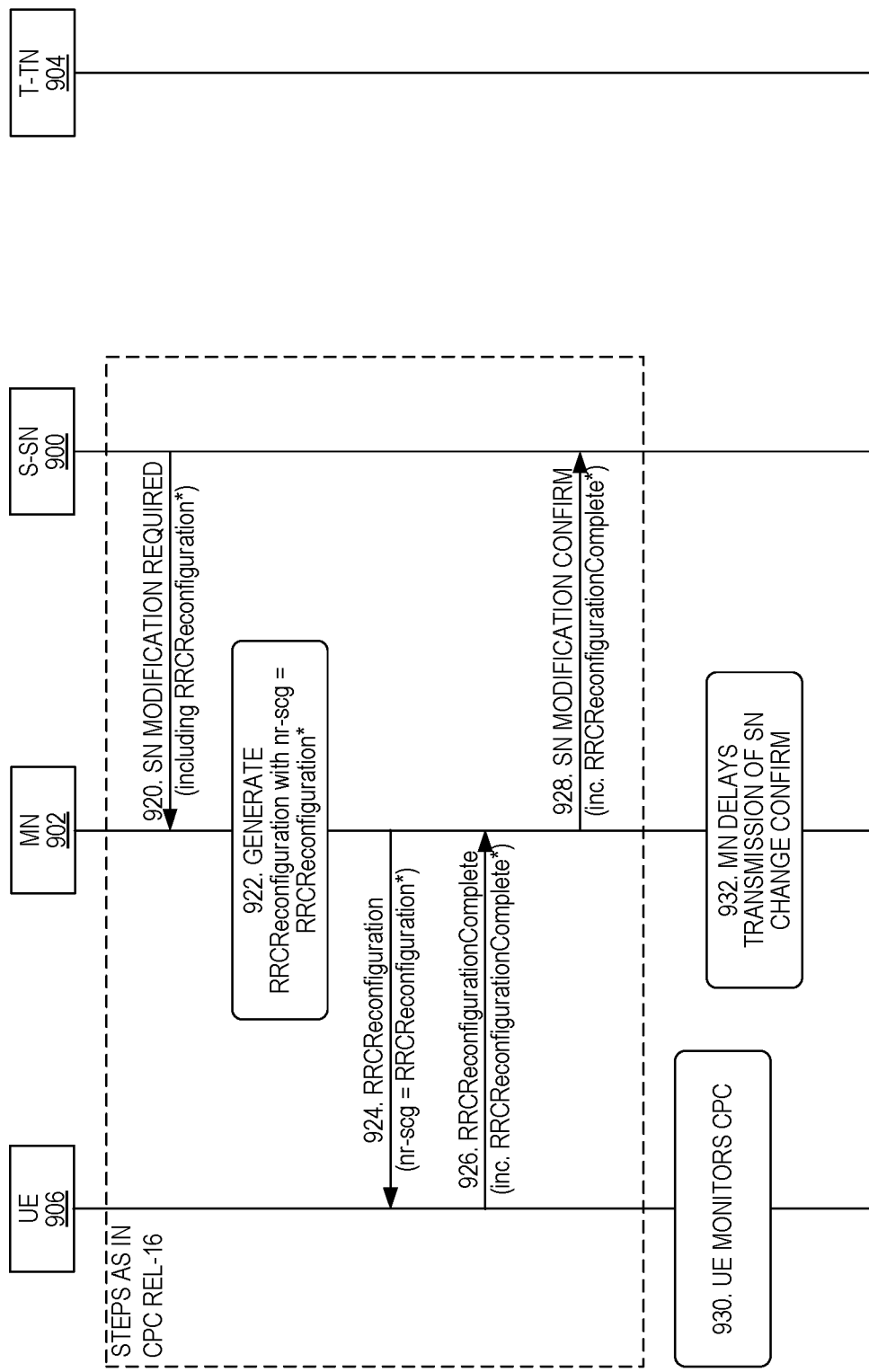

As illustrated in FIGS. 9A and 9B, in a first solution (SN generated CPC), a S-SN 900 determines to configure CPC and transmits to a MN 902 an SN Change Required message including an indication that this is for a conditional procedure, e.g. CPC (step 908). Upon reception of this message, the MN 902 triggers an SN addition procedure with a target candidate SN (T-SN) 904 indicated by the S-SN 900 (step 910). That T-SN 904, upon accepting the CPC request, generates an SCG RRC Reconfiguration to be applied upon execution (RRCReconfiguration) and to be stored by a respective UE 906 upon reception (step 912). The T-SN 904 transmits an SN Addition Request Ack message to the MN 902 including the RRC SCG configuration in RRCReconfiguration in a container (step 914). In this first solution, it is the S-SN 900 that generates the CPC configuration i.e., the RRCReconfiguration that contains the IE ConditionalReconfiguration. Hence, the MN 902 needs to provide to the S-SN 900 the RRCReconfiguration from the T-SN 904 (per target PSCell candidate) e.g., in an SN Change Confirm message (step 916). The S-SN 900** generates RRCReconfiguration* including CPC: RRCReconfiguration (target candidate configuration), conditions/CPC meas-Config (step 918). Upon that, the S-SN 900 triggers an SN modification procedure to configure the UE 906 with CPC, similar to the steps as in legacy Rel-16 CPC from this point onwards. More specifically, the S-SN 900 sends an SN Modification Required message to the MN 902 (step 920**). The CPC configuration is then provided as an SCG RRC Reconfiguration (RRCReconfiguration*) to be applied by the UE 906 upon reception. The MN then creates another RRCReconfiguration that includes the RRCReconfiguration* as an NR SCG configuration (e.g., in the field nr-scg as defined in 3GPP TS 38.331) (step 922) and sends the RRCReconfiguration to the UE 906 (step 924). The UE 906 responds with an RRCReconfigurationComplete (step 926), and the MN 902 returns an SN Modification Confirm message to the S-SN 900 (step 928). The UE 906 monitors CPC (step 930), and the MN 902 delays transmission of SN Change Confirm (step 932). In this solution, the message applied upon CPC execution by the UE 906 is an SN-generated message, namely the RRCReconfiguration**.

Figure 10A:
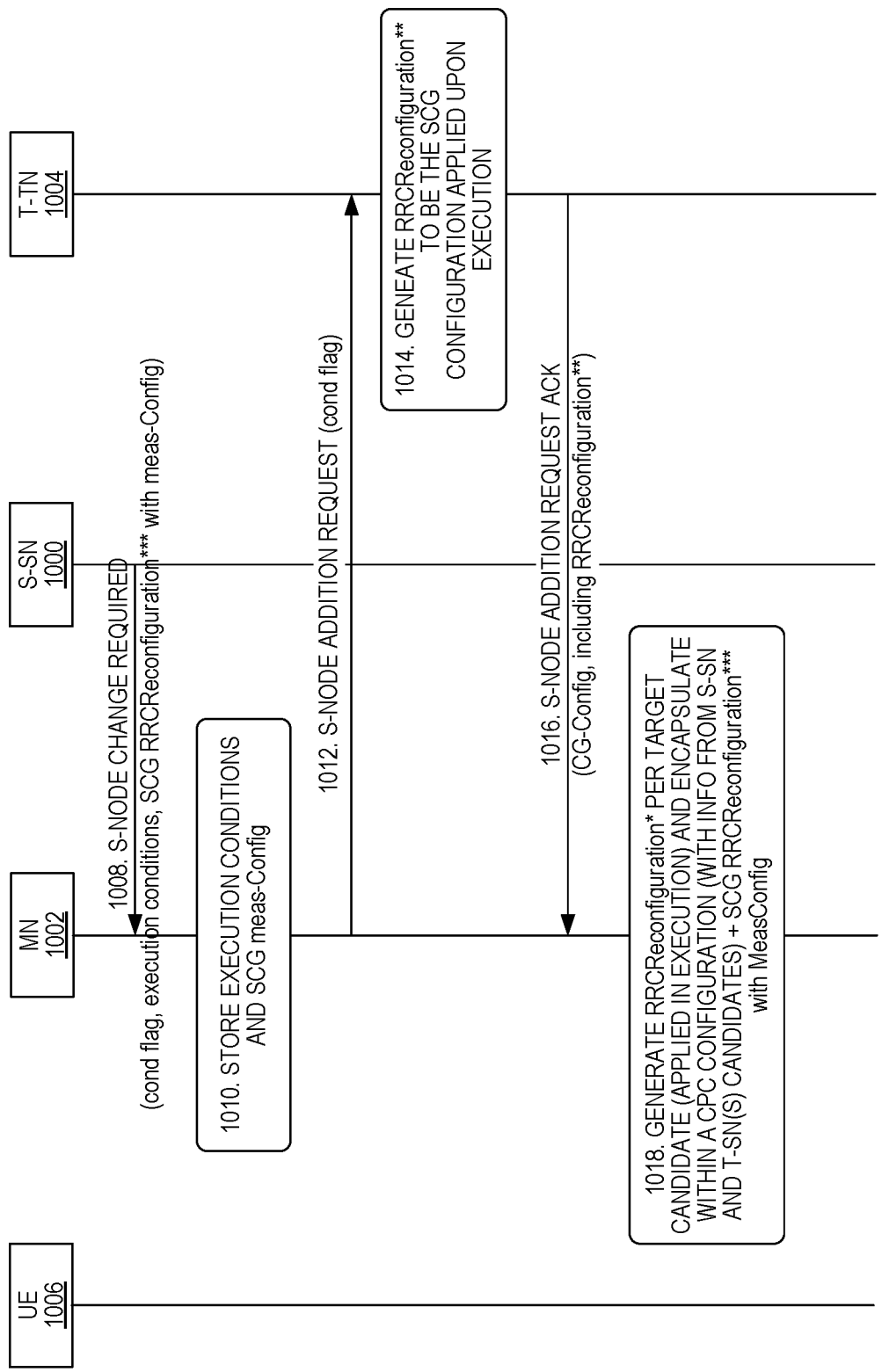
FIGS. 10A and 10B illustrate a procedure for SN-initiated CPC for MN-generated CPC configuration.
Figure 10B:
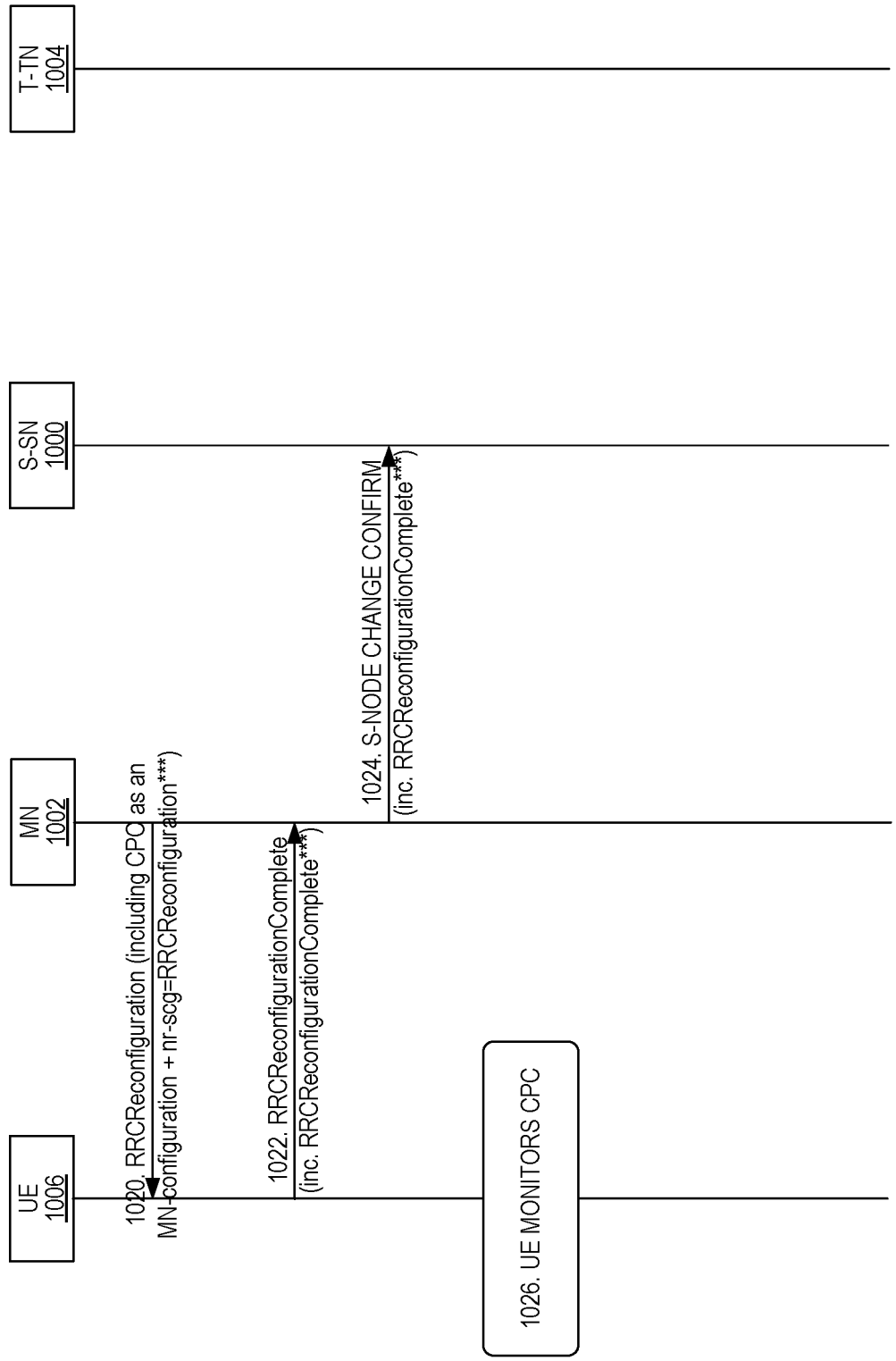

As illustrated in FIGS. 10A and 10B, in a second solution (MN-generated), a S-SN 1000 determines to configure CPC and transmits to a MN 1002 an SN Change Required message including an indication that this is for a conditional procedure e.g., CPC (step 1008). In addition, to enable the MN 1002 to generate the final message to be applied upon execution by a respective UE 1006 and to generate the CPC configuration, the S-SN 1000 also includes in the SN Change Required message the execution conditions per target candidate, and the CPC related measurement configuration (possibly in an RRCReconfiguration* message to be applied upon reception by the UE 1006). The MN 1002 stores the execution conditions and SCG measurement configurations (step 1010). The MN 1002 then triggers steps 1012, 1014, and 1016 as in the first solution to receive from the T-SN 1004 the RRCReconfiguration per target candidate from the T-SN. Then, the MN 1002 generates CPC configuration (as an MN configuration) and may generate an MN message (possibly including MN configuration) to be applied upon CPC execution by the UE 1006, shown in step 1018. The MN 1002 then sends an RRCReconfiguration message including CPC as an MN-configuration+nr-scg=RRCReconfiguration* (step 1020). The UE 1006 responds with an RRCReconfigurationComplete message (step 1022). The MN 1002 sends an S-NODE Change Confirm message to the S-SN 1000 (step 1024). The UE 1006 monitors CPC in accordance with the CPC configuration (step 1026**).

3.2.2 MN-Initiated CPC

In MN-initiated CPC, the difference is that the first step is initiated by the MN. However, an SN Addition procedure is anyways required between the MN and a target candidate T-SN. Even if this is an MN-initiated CPC, in principle the CPC configuration can be created by the SN or by the MN. For a solution where the SN generates the CPC configuration, the MN needs to request the SN to generate the configuration, as in the first solution for SN-initiated (see FIG. 9).

Figure 11:
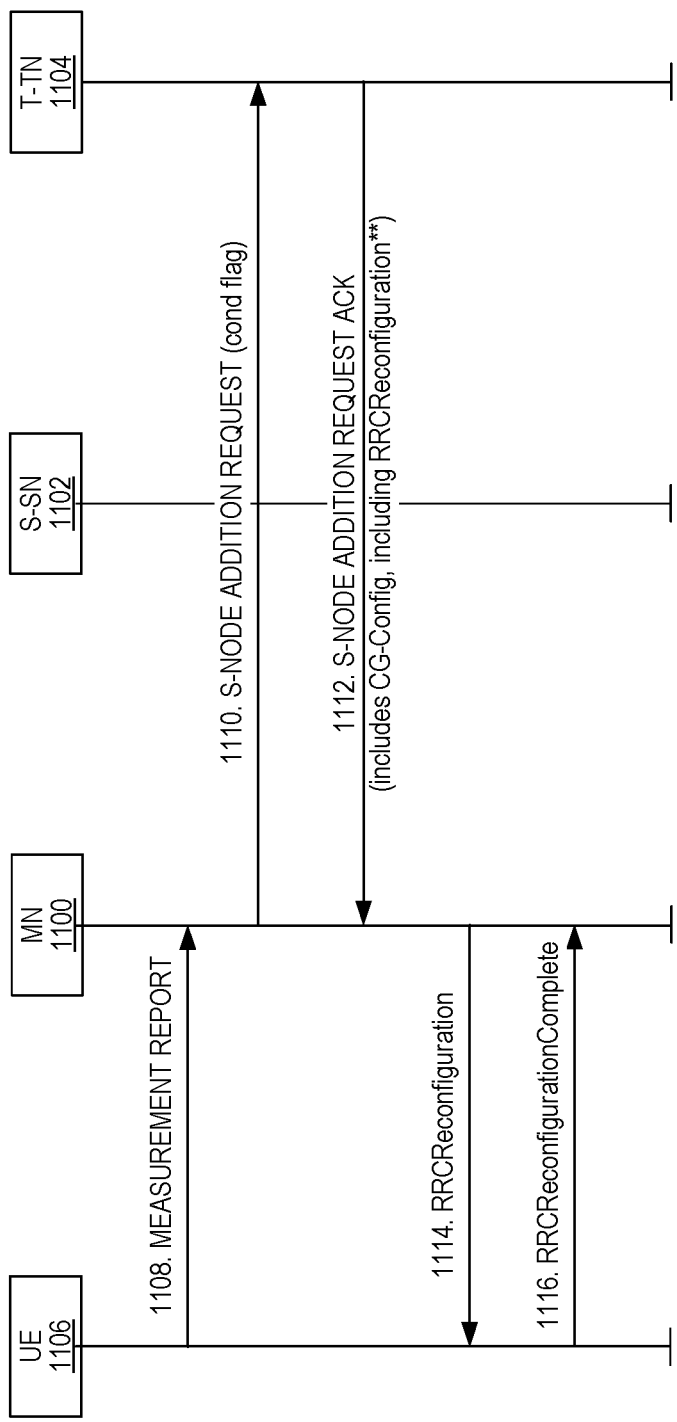
FIG. 11 illustrate a procedure for MN-initiated CPC.

As illustrated in FIG. 11, for a solution where a MN 1100 generates CPC configuration, the MN 1100 does not need to request a S-SN 1102 to generate the configuration as in the second solution for SN-initiated (see FIG. 10). More specifically, a UE 1102 sends a measurement report to the MN 1100 (step 1108). The MN 1100 sends an SN Addition Request to a T-SN 1104 (step 1110). The T-SN 1104 responds with an SN Addition Request Ack including an RRCReconfiguration message to be sent to the UE 1102 for CPC configuration (step 1112). The MN 1100 sends the RRCConfiguration message to the UE 1102 (step 1114), and the UE 1102 responds with an RRCReconfigurationComplete message (step 1116).

In the different solutions presented above for CPC configuration, regardless of whether it is SN-initiated or MN-initiated CPC, the fundamental aspect related to the present disclosure is that the MN triggers an SN addition procedure (with an indication that this is a conditional procedure) towards a target candidate SN (candidate T-SN) by transmitting an SN Addition Request.

3.3 SN Release Procedures for UEs With CPC

The SN release procedure for UEs configured with CPC can be initiated by the MN or by the SN.

3.3.1 MN-Initiated SN Release Procedures for UEs With CPC

Figure 12:
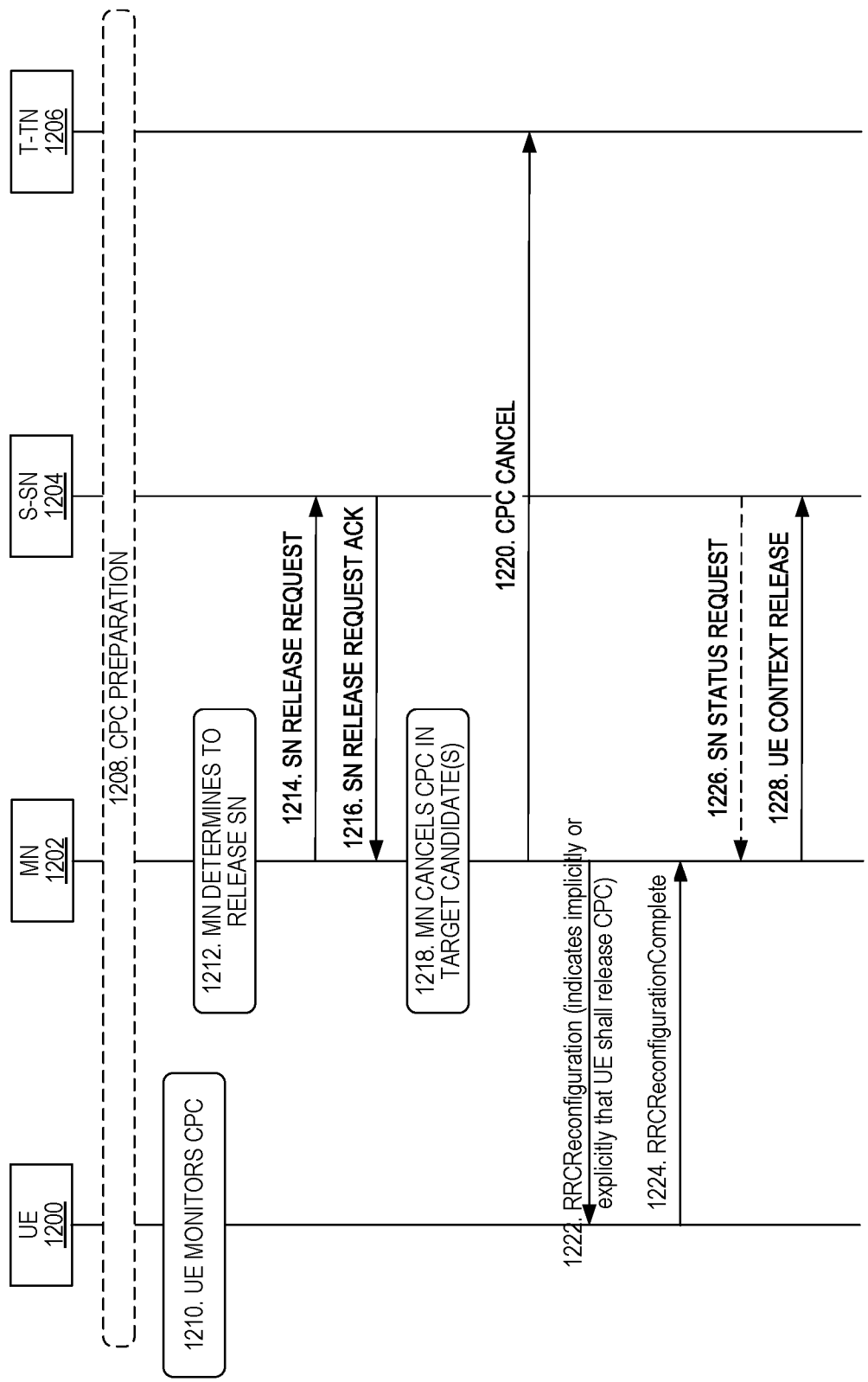
FIG. 12 illustrates an MN-initiated SN release procedure for a UE with CPC in accordance with one embodiment of the present disclosure.

FIG. 12 illustrates a MN-initiated SN release procedure for UEs with CPC in accordance with one embodiment of the present disclosure. As illustrated, the procedure involves a UE 1200, a MN 1202, a S-SN 1204, and a T-SN 1206. CPC preparation is performed during which the UE 1200 is configured for CPC (step 1208). The UE 1200 monitors CPC accordingly (step 1210). In one embodiment, the MN 1202 determines to initiate an SN Release procedure and determines that the UE 1200 is configured with CPC (e.g., by requesting the UE's current SCG configuration) (step 1212). Upon that step, the MN 1202 transmits an SN Release Request to the S-SN 1204 (step 1214). Upon receiving the SN Release Request, the S-SN 1204 responds with an SN Release Request Acknowledge message (step 1216).

Upon receiving an SN Release Request Acknowledge message, and upon having determined that the UE 1200 is configured with CPC associated to at least one T-SN 1206, the MN 1202 triggers a cancel procedure (e.g. CPC Cancel procedure, CPA cancel procedure) towards the candidate T-SN 1206 (step 1218), for example by transmitting a message to the T-SN indicating to the T-SN that CPC is to be cancelled (step 1220). The message possibly includes a cause value indicating that this is due to an S-SN release. In response to the CPC cancellation message, the T-SN 1206 releases the CPC configuration for the UE 1200 at the T-SN 1206. In a variant of that embodiment, the cancelling of CPC towards the T-SN 1206 by the MN 1202 is performed before the SN Release procedure towards the S-SN 1204.

Upon cancelling CPC towards the T-SN 1206, the MN 1202 generates an RRCReconfiguration including an implicit or explicit indication that the UE 1200 is to release CPC (step 1222). The UE 1200 responds to the MN 1202 with an RRCReconfigurationComplete message (step 1224). The MN 1202 may receive an SN Status Transfer message from the S-SN 1204 (step 1226). The MN 1202 sends a UE Context Release to the S-SN 1204 (step 1228).

An example of a new CPC/CPA Cancel message (from MN to target candidate SN), which can be used, e.g., in step 1220, is given below:

Example CPC/CPA Cancel Message

9.1.2.x Conditional PSCell Addition Cancel

This message is sent by the M-NG-RAN node to the S-NG-RAN node to cancel the Conditional PSCell Addition.
Direction: M-NG-RAN node → S-NG-RAN node.

| IE/Group Name | Presence | Range | IE type and reference | Semantics description |
|---|---|---|---|---|
| Message Type | M | | 9.2.3.1 | |
| M-NG-RAN node UE XnAP ID | M | | NG-RAN node UE XnAP ID 9.2.3.16 | Allocated at the M-NG-RAN node |
| S-NG-RAN node UE XnAP ID | M | | NG-RAN node UE XnAP ID 9.2.3.16 | Allocated at the S-NG-RAN node |
| Cause | M | | 9.2.3.2 | |

End Example CPC/CPA Cancel Message

In another alternative, the MN will send a S-NODE RELEASE REQUEST message to the T-SN, which will trigger an S-NODE RELEASE REQUEST ACKNOWLEDGE from T-SN to MN.

A new CPC/CPA Cancel message (from the MN 1202 to the T-SN 1206) is shown as an example, but the message from the MN 1202 to the T-SN 1206 indicating the cancelling of the previously configured CPC (or CPA) could be performed with other messages such as: SN release request or SN modification request. Also, in the example of FIG. 12, a class 2 procedure (i.e., a single message from MN to target candidate SN, with no expected response message) is shown as an example. However, in other variants, the T-SN 1206 transmits a response message, e.g. SN release request acknowledgment or an SN modification confirm.

Figure 13:
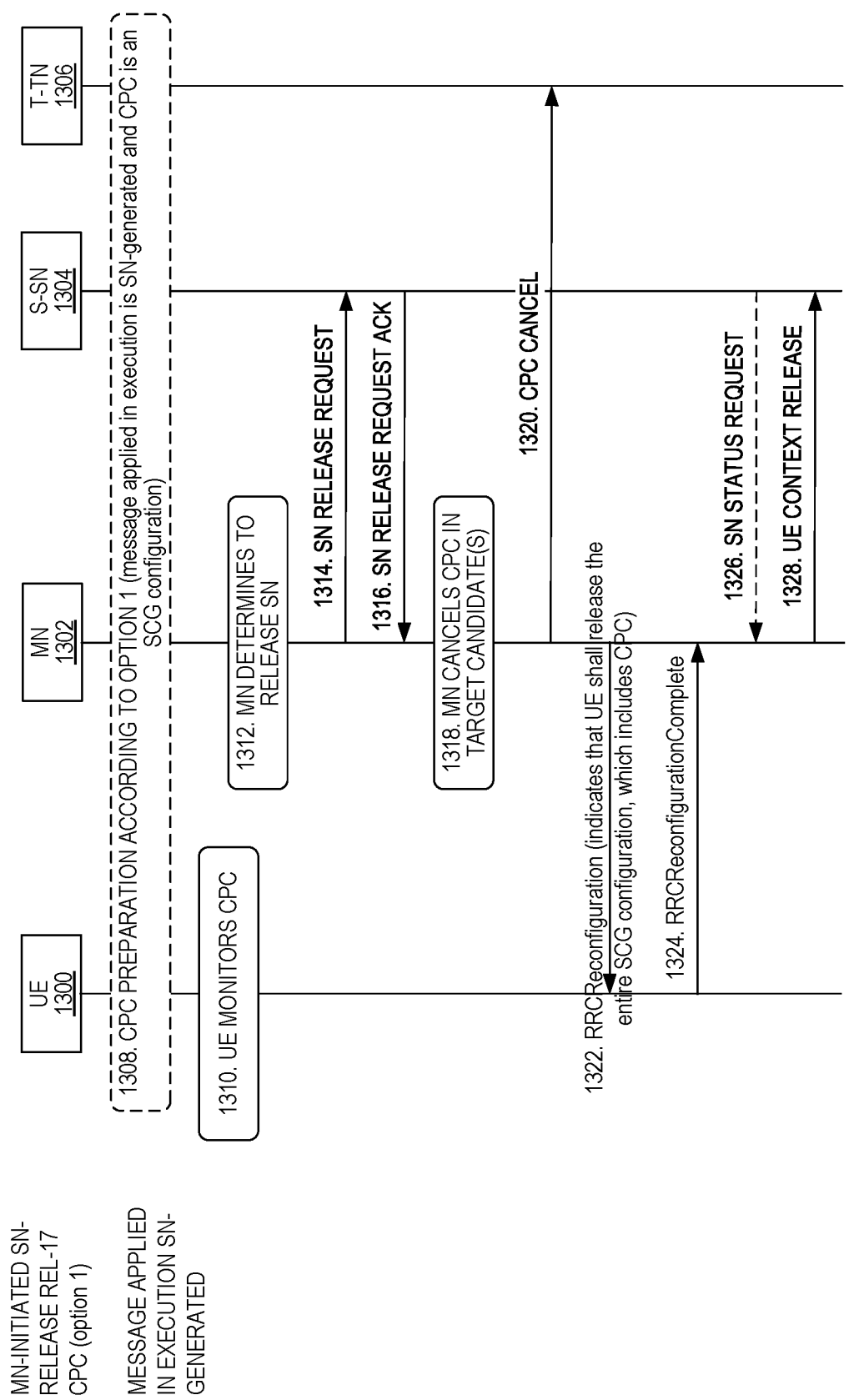
FIG. 13 illustrates an MN-initiated SN release procedure for a UE with CPC in accordance with another embodiment of the present disclosure.

FIG. 13 illustrates a MN-initiated SN release procedure for UEs with CPC in accordance with another embodiment of the present disclosure. This embodiment is for SN-initiated CPC. As illustrated, the procedure involves a UE 1300, a MN 1302, a S-SN 1304, and a T-SN 1306. CPC preparation is performed during which the UE 1300 is configured for CPC (step 1308). Here, the CPC preparation involves a message applied in execution is SN-generated and CPC is an SCG configuration. The UE 1300 monitors CPC accordingly (step 1310). In one embodiment, the MN 1302 determines to initiate an SN Release procedure and determines that the UE 1300 is configured with CPC (e.g., by requesting the UE's current SCG configuration) (step 1312). Upon that step, the MN 1302 transmits an SN Release Request to the S-SN 1304 (step 1314). Upon receiving the SN Release Request, the S-SN 1304 responds with an SN Release Request Acknowledge message (step 1316).

Upon receiving an SN Release Request Acknowledge message, and upon having determined that the UE 1300 is configured with CPC associated to at least one T-SN 1306, the MN 1302 triggers a cancel procedure (e.g., CPC Cancel procedure, CPA cancel procedure) towards the candidate T-SN 1306 (step 1318), for example by transmitting a message to the T-SN indicating to the T-SN that CPC is to be cancelled, as described above (step 1320). The message possibly includes a cause value indicating that this is due to an S-SN release. In a variant of that embodiment, the cancelling of CPC towards the T-SN 1306 by the MN 1302 is performed before the SN Release procedure towards the S-SN 1304.

Upon cancelling CPC towards the T-SN 1306, the MN 1302 generates an RRCReconfiguration indicating the release of MR-DC to the UE 1300 (e.g., by the field mrdc-SecondaryCellGroupConfig set to release) (step 1322). Since the CPC configuration has been generated by the S-SN 1304, the reception triggers the UE 1300 to release the SCG, including the release of CPC (considered as part of the SCG configuration). Notice that a release of CPC triggered by the release of MR-DC is suitable for an SN-generated CPC. The reason is that CPC would be an SCG configuration, i.e. releasing MR-DC leads to the release of SCG configuration which leads to the release of CPC. The UE 1300 responds to the MN 1302 with an RRCReconfigurationComplete message (step 1324). The MN 1302 may receive an SN Status Transfer message from the S-SN 1304 (step 1326). The MN 1302 sends a UE Context Release to the S-SN 1304 (step 1328).

This implicit UE release of CPC upon the release of MR-DC is shown below as exemplary text that may be added to the appropriate 3GPP TS:

Showing of Implicit UE Release of CPC Upon the Release of MR-DC 5.3.5.3 Reception of an RRCReconfiguration by the UE

---

The UE shall perform the following actions upon reception of the RRCReconfiguration, or upon execution of the conditional reconfiguration (CHO or CPC):
[...]
1> if the RRCReconfiguration includes the mrdc-SecondaryCellGroupConfig:
[...]
2> else (mrdc-SecondaryCellGroupConfig is set to release):
3> perform MR-DC release as specified in clause 5.3.5.10;
[...]

---

5.3.5.10 MR-DC Release

---

The UE shall:
1> as a result of MR-DC release triggered by E-UTRA or NR:
[...]
2> release measConfig associated with SCG;
2> if the UE is configured with NR SCG:
3> release the SCG configuration as specified in clause 5.3.5.4;
[...]
　　[...]

---

5.3.5.4 Secondary Cell Group Release

---

The UE shall:
1> as a result of SCG release triggered by E-UTRA (i.e. (NG)EN-DC case) or NR (i.e. NR-DC case):
[...]
2> if CPC was configured,
3> remove all the entries within VarConditionalReconfig, if any;
[...]

End Showing of Implicit UER of CPC Upon the Release of MR-DC

For an MN-generated CPC, one option based on MR-DC release is to delete CPC if MR-DC is released, even if CPC is MN-generated. For that, the UE would first need to determine that an MN-generated CPC is configured, for example, by the UE determining that it is configured with ConditionalReconfiguration Information Element (IE) whose target candidate(s) configuration to be applied upon execution contain an RRCReconfiguration containing a reconfiguration with sync for the secondary cell group (if it would have been for the master cell group this would have been a conditional handover—CHO, and not CPC). In addition to remove the CPC configurations, the UE releases the associated measurement configuration associated to it, i.e. the reportConfig(s) whose trigger is associated to conditional reconfiguration, in particular with CPC, and measurement objects and measId only associated to conditional reconfiguration, in particular CPC. An example is shown below:

Showing Release Releases the Associated Measurement Configuration 5.3.5.4 Secondary Cell Group Release

```
The UE shall:
1> as a result of SCG release triggered by E-UTRA (i.e. (NG)EN-DC case) or NR (i.e.
   NR-DC case):
[...]
2> if CPC was configured,
3> remove all the entries within VarConditionalReconfig, if any;
3> for each measId of the source SpCell configuration, if the associated reportConfig
   has a reportType set to condTriggerConfig:
4> for the associated reportConfigId:
5> remove the entry with the matching reportConfigId from the reportConfigList
   within the VarMeasConfig;
4> if the associated measObjectId is only associated to a reportConfig with reportType
   set to cho-TriggerConfig:
5> remove the entry with the matching measObjectId from the measObjectList within
   the VarMeasConfig;
4> remove the entry with the matching measId from the measIdList within the
   VarMeasConfig:
[...]
```

Showing Release Releases the Associated Measurement Configuration (Explicit solution) Else, if the CPC configuration has been generated by the MN, the MN upon cancelling CPC towards T-SN needs to explicitly indicate to the UE to remove CPC, e.g. by removing the CPC using the remove list for conditional reconfiguration (including indexes for all configure CPC candidates). An example is shown below with the overall procedure, for the case CPC is an MN-generated configuration (i.e., the IE ConditionalReconfiguration is provided to the UE in an RRCReconfiguration message including the condReconfigToRemoveList).

Example of Overall Procedure

```
RRCReconfiguration-v1610-IEs ::=  SEQUENCE {
[...]
    conditionalReconfiguration-r16        ConditionalReconfiguration-r16
OPTIONAL, -- Need M
[...]
}
```

ConditionalReconfiguration

The IE ConditionalReconfiguration is used to add, modify and release the configuration of conditional reconfiguration.

ConditionalReconfiguration Information Element

```
-- ASN1START
-- TAG-CONDITIONALRECONFIGURATION-START
ConditionalReconfiguration-r16 ::=   SEQUENCE {
[...]
    condReconfigToRemoveList-r16      CondReconfigToRemoveList-r16       OPTIONAL,   -- Need N
[...]
}
CondReconfigToRemoveList-r16 ::=   SEQUENCE (SIZE (1.. maxNrofCondCells-r16)) OF CondReconfigId-r16
--TAG-CONDITIONALRECONFIGURATION-STOP
-- ASN1 STOP
```

The UE actions are defined as follows:

5.3.5.13.2 Conditional Reconfiguration Removal

The UE shall:
1> for each condReconfigId value included in the condReconfigToRemoveList that is part of the current UE conditional reconfiguration in VarConditionalReconfig:
2> remove the entry with the matching condReconfigId from the VarConditionalReconfig;

End Example of Overall Procedure

In addition to removing the CPC configurations, the MN releases the associated measurement configuration associated to it, i.e. the reportConfig(s) whose trigger is associated to conditional reconfiguration, in particular with CPC, and measurement objects and measId only associated to conditional reconfiguration, in particular CPC.

If there are multiple target candidate SN(s), the MN triggers the procedure towards all of the configured T-SN candidates.

3.3.2 SN-Initiated SN Release Procedures for UEs With CPC

Figure 14:
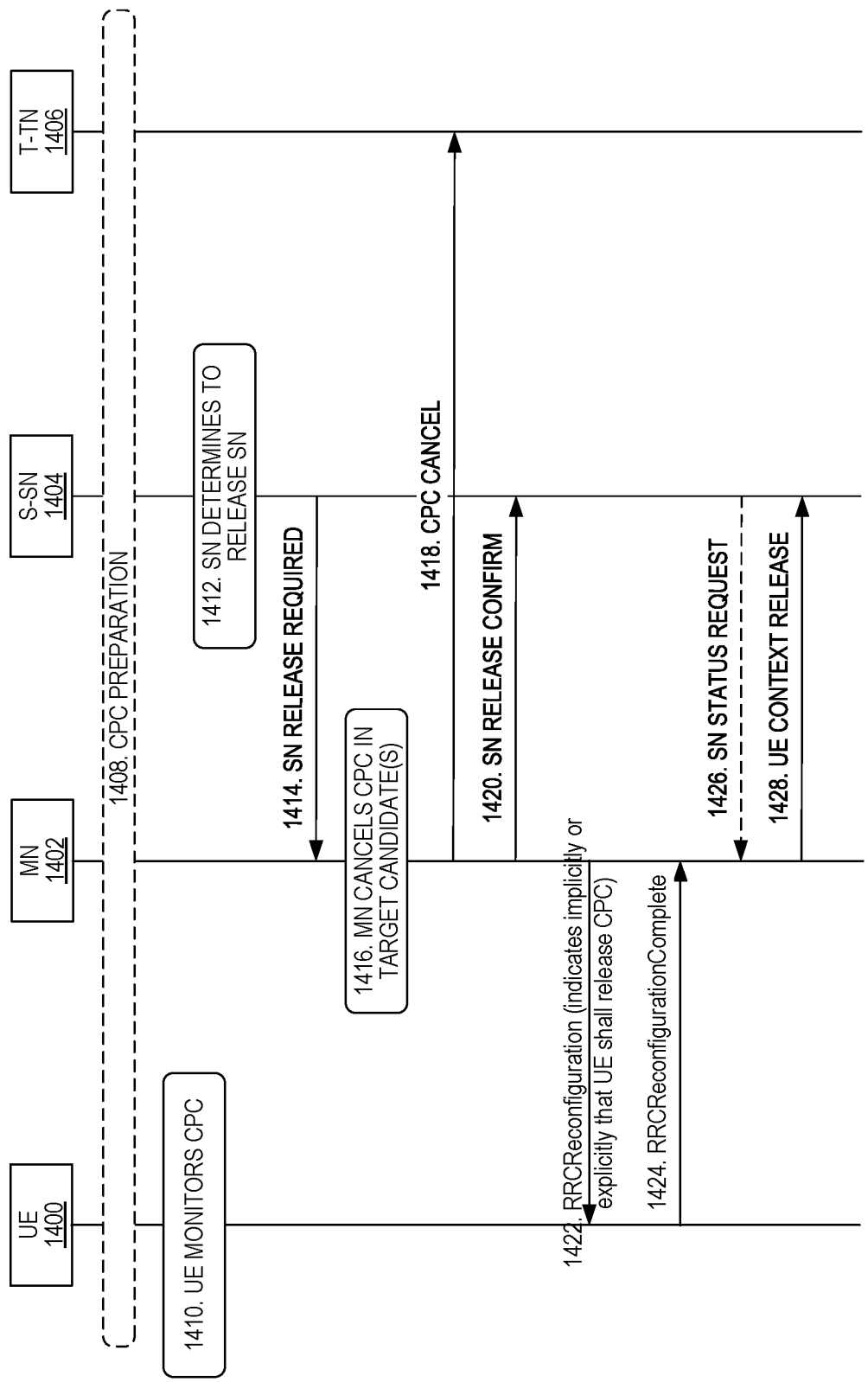
FIG. 14 illustrates an SN-initiated SN release procedure for a UE with CPC in accordance with one embodiment of the present disclosure.

FIG. 14 illustrates an SN-initiated SN release procedure for UEs with CPC in accordance with one embodiment of the present disclosure. As illustrated, the procedure involves a UE 1400, a MN 1402, a S-SN 1404, and a T-SN 1406. CPC preparation is performed during which the UE 1400 is configured for CPC (step 1408). The UE 1400 monitors CPC accordingly (step 1410). In one embodiment, the S-SN 1404 determines to initiate an SN Release procedure and determines that the UE 1400 is configured with CPC (step 1412). Upon that step, the S-SN 1404 transmits an SN Release Required message to the MN 1402 (step 1414). Upon the reception of the message and upon having determined that the UE 1400 is configured with CPC associated to at least one T-SN 1406, the MN 1402 triggers a procedure to cancel CPC towards the T-SN 1406 (which may be a CPC and/or CPA cancel procedure, or any other procedure where MN indicates to T-SN that conditional reconfiguration is to be cancelled) (step 1416), for example by transmitting a message to the T-SN indicating to the T-SN that CPC is to be cancelled (step 1418). The message possibly includes a cause value indicating that this is due to an S-SN release. The MN 1402 sends an SN Release Confirm message to the S-SN 1404 (step 1420). The MN 1404 also sends, to the UE 1400, an RRCReconfiguration message that implicitly or explicitly indicates that the UE 1400 is to release CPC (step 1422). The UE 1400 responds with an RRCReconfigurationComplete message (step 1424). The MN 1402 may receive an SN Status Transfer message from the S-SN 1404 (step 1426). The MN 1402 sends a UE Context Release to the S-SN 1404 (step 1428).

In one example, as shown in FIG. 14 for step 1418, the MN 1402 sends a CPC Cancel message to the T-SN 1406. However, other examples can be a CPA cancel message, or an S-NODE RELEASE REQUEST. Also, the example in FIG. 14 shows a class 2 procedure, i.e. one message from MN to candidate target SN without a response from T-SN. However, another option could be a class 1 procedure where the candidate T-SN confirms/acknowledges the cancel of CPC. Notice that from the T-SN(s) perspective, a CPC cancel and CPA cancel may be equivalent (that is why these terms CPA or CPC cancelled are used equivalently herein).

FIG. 14 also shows that step 1420 (SN Release confirm from the MN 1402 to the S-SN 1404) happens after step 1418, i.e. after the MN 1402 has indicated to the T-SN 1406 that CPC/CPA is to be cancelled. However, an alternative can be that step 1420 (i.e., transmission of SN Release Confirm from MN to S-SN) happens only after the MN 1402 has received a confirmation from the UE 1400 that MR-DC (and consequently CPC configuration(s)) have been released (and CPC has been removed).

Figure 15:
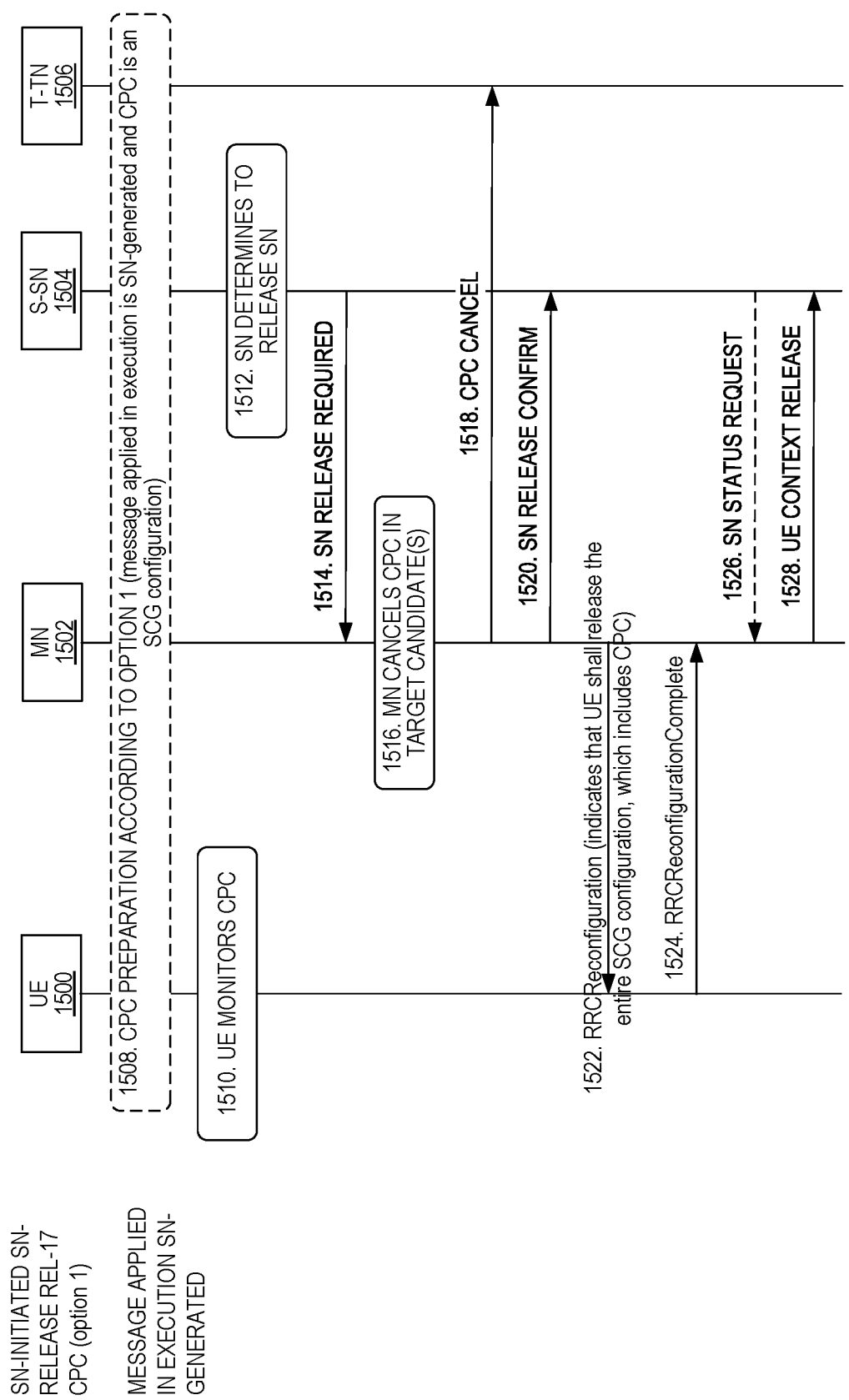
FIG. 15 illustrates an SN-initiated SN release procedure for a UE with CPC in accordance with another embodiment of the present disclosure.

FIG. 15 illustrates a SN-initiated SN release procedure for UEs with CPC in accordance with another embodiment of the present disclosure. This embodiment is for SN-initiated CPC. As illustrated, the procedure involves a UE 1500, a MN 1502, a S-SN 1504, and a T-SN 1506. CPC preparation is performed during which the UE 1500 is configured for CPC (step 1508). Here, the CPC configuration is SN generated and CPC is a SCG configuration. The UE 1500 monitors CPC accordingly (step 1510). In one embodiment, the S-SN 1504 determines to initiate an SN Release procedure and determines that the UE 1500 is configured with CPC (step 1512). Upon that step, the S-SN 1504 transmits an SN Release Required message to the MN 1502 (step 1514). Upon the reception of the message and upon having determined that the UE 1500 is configured with CPC associated to at least one T-SN 1506, the MN 1502 triggers a procedure to cancel CPC towards the T-SN 1506 (which may be a CPC and/or CPA cancel procedure, or any other procedure where MN indicates to T-SN that conditional reconfiguration is to be cancelled) (step 1516), for example by transmitting a message to the T-SN indicating to the T-SN that CPC is to be cancelled (step 1518). The message possibly includes a cause value indicating that this is due to an S-SN release. The MN 1502 sends an SN Release Confirm message to the S-SN 1504 (step 1520). Upon cancelling CPC towards a T-SN 1506, the MN 1502 generates an RRCReconfiguration indicating the release of MR-DC to the UE 1500 (e.g., by the field mrdc-SecondaryCellGroupConfig set to release) (step 1522). Since the CPC configuration has been generated by the S-SN 1504, the reception triggers the UE 1500 to release the SCG, including the release of CPC (considered as part of the SCG configuration). The UE 1500 responds with an RRCReconfigurationComplete message (step 1524). The MN 1502 may receive an SN Status Transfer message from the S-SN 1504 (step 1526). The MN 1502 sends a UE Context Release to the S-SN 1504 (step 1528).

Conversely, if the CPC configuration has been generated by the MN, the MN upon cancelling CPC towards T-SN needs to explicitly indicate to the UE to remove CPC, e.g. by removing the CPC using the remove list for conditional reconfiguration (including indexes for all configure CPC candidates). For the case CPC is an MN-generated configuration (i.e., the IE ConditionalReconfiguration is provided to the UE in an RRCReconfiguration message including the condReconfigToRemoveList). In addition to remove the CPC configurations, the MN releases the associated measurement configuration associated to it, i.e. the reportConfig(s) whose trigger is associated to conditional reconfiguration, in particular with CPC, and measurement objects and measId only associated to conditional reconfiguration, in particular CPC.

This is similar to the previous example of MN-initiated SN Release.

4 Example System in which Embodiments May be Implemented

Figure 16:
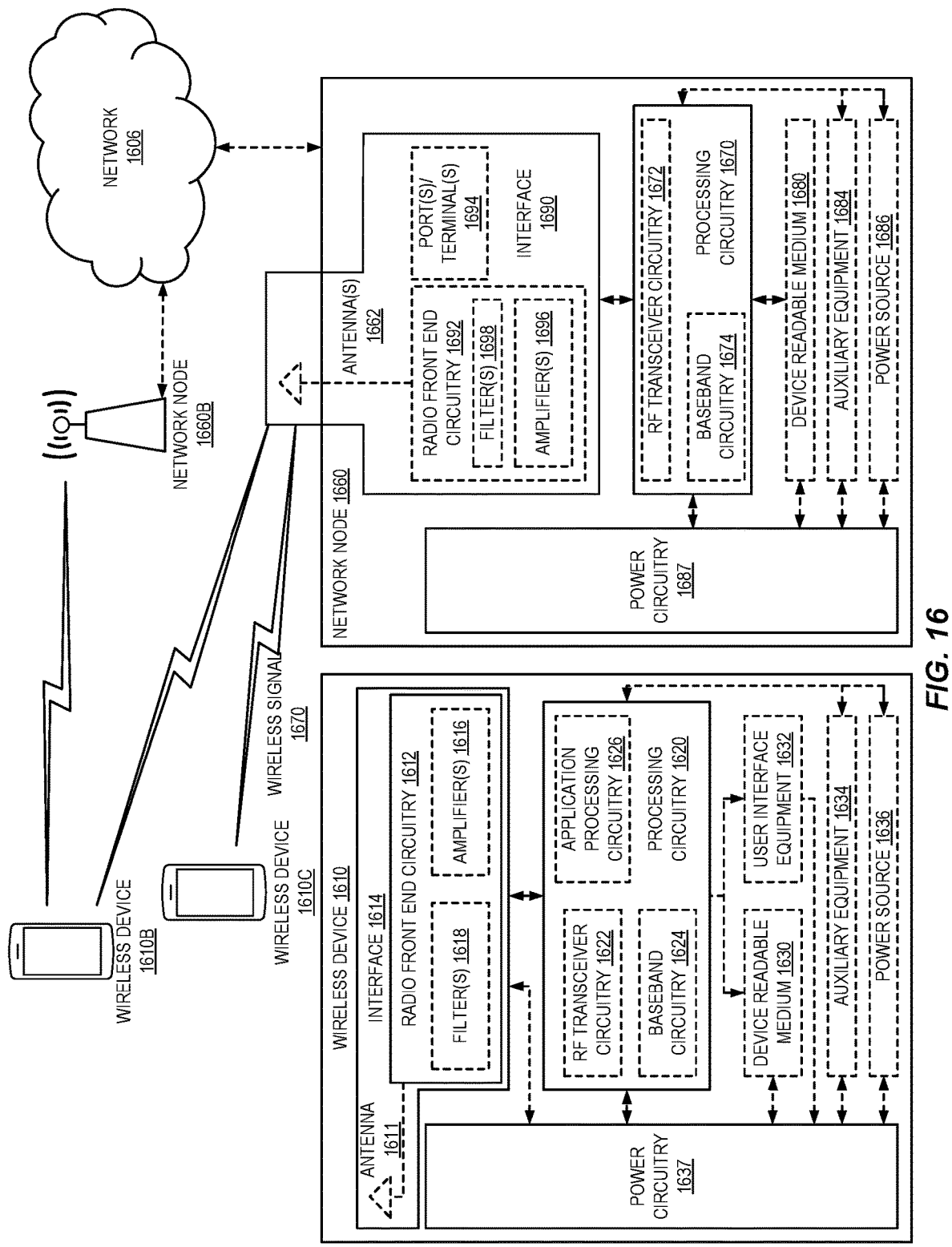
FIG. 16 illustrates one example of a system in which embodiments of the present disclosure may be implemented.

Although the subject matter described herein may be implemented in any appropriate type of system using any suitable components, the embodiments disclosed herein are described in relation to a wireless network, such as the example wireless network illustrated in FIG. 16. For simplicity, the wireless network of FIG. 16 only depicts network 1606, network nodes 1660 and 1660*b*, and WDs 1610, 1610*b*, and 1610*c*. In practice, a wireless network may further include any additional elements suitable to support communication between wireless devices or between a wireless device and another communication device, such as a landline telephone, a service provider, or any other network node or end device. Of the illustrated components, network node 1660 and wireless device (WD) 1610 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1606 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1660 and WD 1610 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 16, network node 1660 includes processing circuitry 1670, device readable medium 1680, interface 1690, auxiliary equipment 1684, power source 1686, power circuitry 1687, and antenna 1662. Although network node 1660 illustrated in the example wireless network of FIG. 16 may represent a device that includes the illustrated combination of hardware components, other embodiments may comprise network nodes with different combinations of components. It is to be understood that a network node comprises any suitable combination of hardware and/or software needed to perform the tasks, features, functions, and methods disclosed herein. Moreover, while the components of network node 1660 are depicted as single boxes located within a larger box, or nested within multiple boxes, in practice, a network node may comprise multiple different physical components that make up a single illustrated component (e.g., device readable medium 1680 may comprise multiple separate hard drives as well as multiple RAM modules).

Similarly, network node 1660 may be composed of multiple physically separate components (e.g., a NodeB component and a RNC component, or a BTS component and a BSC component, etc.), which may each have their own respective components. In certain scenarios in which network node 1660 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 1660 may be configured to support multiple radio access technologies (RATs). In such embodiments, some components may be duplicated (e.g., separate device readable medium 1680 for the different RATs) and some components may be reused (e.g., the same antenna 1662 may be shared by the RATs). Network node 1660 may also include multiple sets of the various illustrated components for different wireless technologies integrated into network node 1660, such as, for example, GSM, WCDMA, LTE, NR, WiFi, or Bluetooth wireless technologies. These wireless technologies may be integrated into the same or different chip or set of chips and other components within network node 1660.

Processing circuitry 1670 is configured to perform any determining, calculating, or similar operations (e.g., certain obtaining operations) described herein as being provided by a network node. These operations performed by processing circuitry 1670 may include processing information obtained by processing circuitry 1670 by, for example, converting the obtained information into other information, comparing the obtained information or converted information to information stored in the network node, and/or performing one or more operations based on the obtained information or converted information, and as a result of said processing making a determination.

Processing circuitry 1670 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1660 components, such as device readable medium 1680, network node 1660 functionality. For example, processing circuitry 1670 may execute instructions stored in device readable medium 1680 or in memory within processing circuitry 1670. Such functionality may include providing any of the various wireless features, functions, or benefits discussed herein. In some embodiments, processing circuitry 1670 may include a system on a chip (SOC).

In some embodiments, processing circuitry 1670 may include one or more of radio frequency (RF) transceiver circuitry 1672 and baseband processing circuitry 1674. In some embodiments, radio frequency (RF) transceiver circuitry 1672 and baseband processing circuitry 1674 may be on separate chips (or sets of chips), boards, or units, such as radio units and digital units. In alternative embodiments, part or all of RF transceiver circuitry 1672 and baseband processing circuitry 1674 may be on the same chip or set of chips, boards, or units In certain embodiments, some or all of the functionality described herein as being provided by a network node, base station, eNB or other such network device may be performed by processing circuitry 1670 executing instructions stored on device readable medium 1680 or memory within processing circuitry 1670. In alternative embodiments, some or all of the functionality may be provided by processing circuitry 1670 without executing instructions stored on a separate or discrete device readable medium, such as in a hard-wired manner. In any of those embodiments, whether executing instructions stored on a device readable storage medium or not, processing circuitry 1670 can be configured to perform the described functionality. The benefits provided by such functionality are not limited to processing circuitry 1670 alone or to other components of network node 1660, but are enjoyed by network node 1660 as a whole, and/or by end users and the wireless network generally.

Device readable medium 1680 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1670. Device readable medium 1680 may store any suitable instructions, data or information, including a computer program, software, an application including one or more of logic, rules, code, tables, etc. and/or other instructions capable of being executed by processing circuitry 1670 and, utilized by network node 1660. Device readable medium 1680 may be used to store any calculations made by processing circuitry 1670 and/or any data received via interface 1690. In some embodiments, processing circuitry 1670 and device readable medium 1680 may be considered to be integrated.

Interface 1690 is used in the wired or wireless communication of signalling and/or data between network node 1660, network 1606, and/or WDs 1610. As illustrated, interface 1690 comprises port(s)/terminal(s) 1694 to send and receive data, for example to and from network 1606 over a wired connection. Interface 1690 also includes radio front end circuitry 1692 that may be coupled to, or in certain embodiments a part of, antenna 1662. Radio front end circuitry 1692 comprises filters 1698 and amplifiers 1696. Radio front end circuitry 1692 may be connected to antenna 1662 and processing circuitry 1670. Radio front end circuitry may be configured to condition signals communicated between antenna 1662 and processing circuitry 1670. Radio front end circuitry 1692 may receive digital data that is to be sent out to other network nodes or WDs via a wireless connection. Radio front end circuitry 1692 may convert the digital data into a radio signal having the appropriate channel and bandwidth parameters using a combination of filters 1698 and/or amplifiers 1696. The radio signal may then be transmitted via antenna 1662. Similarly, when receiving data, antenna 1662 may collect radio signals which are then converted into digital data by radio front end circuitry 1692. The digital data may be passed to processing circuitry 1670. In other embodiments, the interface may comprise different components and/or different combinations of components.

In certain alternative embodiments, network node 1660 may not include separate radio front end circuitry 1692, instead, processing circuitry 1670 may comprise radio front end circuitry and may be connected to antenna 1662 without separate radio front end circuitry 1692. Similarly, in some embodiments, all or some of RF transceiver circuitry 1672 may be considered a part of interface 1690. In still other embodiments, interface 1690 may include one or more ports or terminals 1694, radio front end circuitry 1692, and RF transceiver circuitry 1672, as part of a radio unit (not shown), and interface 1690 may communicate with baseband processing circuitry 1674, which is part of a digital unit (not shown).

Antenna 1662 may include one or more antennas, or antenna arrays, configured to send and/or receive wireless signals. Antenna 1662 may be coupled to radio front end circuitry 1690 and may be any type of antenna capable of transmitting and receiving data and/or signals wirelessly. In some embodiments, antenna 1662 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1662 may be separate from network node 1660 and may be connectable to network node 1660 through an interface or port.

Antenna 1662, interface 1690, and/or processing circuitry 1670 may be configured to perform any receiving operations and/or certain obtaining operations described herein as being performed by a network node. Any information, data and/or signals may be received from a wireless device, another network node and/or any other network equipment. Similarly, antenna 1662, interface 1690, and/or processing circuitry 1670 may be configured to perform any transmitting operations described herein as being performed by a network node. Any information, data and/or signals may be transmitted to a wireless device, another network node and/or any other network equipment.

Power circuitry 1687 may comprise, or be coupled to, power management circuitry and is configured to supply the components of network node 1660 with power for performing the functionality described herein. Power circuitry 1687 may receive power from power source 1686. Power source 1686 and/or power circuitry 1687 may be configured to provide power to the various components of network node 1660 in a form suitable for the respective components (e.g., at a voltage and current level needed for each respective component). Power source 1686 may either be included in, or external to, power circuitry 1687 and/or network node 1660. For example, network node 1660 may be connectable to an external power source (e.g., an electricity outlet) via an input circuitry or interface such as an electrical cable, whereby the external power source supplies power to power circuitry 1687. As a further example, power source 1686 may comprise a source of power in the form of a battery or battery pack which is connected to, or integrated in, power circuitry 1687. The battery may provide backup power should the external power source fail. Other types of power sources, such as photovoltaic devices, may also be used.

Alternative embodiments of network node 1660 may include additional components beyond those shown in FIG. 16 that may be responsible for providing certain aspects of the network node's functionality, including any of the functionality described herein and/or any functionality necessary to support the subject matter described herein. For example, network node 1660 may include user interface equipment to allow input of information into network node 1660 and to allow output of information from network node 1660. This may allow a user to perform diagnostic, maintenance, repair, and other administrative functions for network node 1660.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal Furthermore, a WD as described above may be mobile, in which case it may also be referred to as a mobile device or a mobile terminal.

As illustrated, wireless device 1610 includes antenna 1611, interface 1614, processing circuitry 1620, device readable medium 1630, user interface equipment 1632, auxiliary equipment 1634, power source 1636 and power circuitry 1637. WD 1610 may include multiple sets of one or more of the illustrated components for different wireless technologies supported by WD 1610, such as, for example, GSM, WCDMA, LTE, NR, WiFi, WiMAX, or Bluetooth wireless technologies, just to mention a few. These wireless technologies may be integrated into the same or different chips or set of chips as other components within WD 1610.

Antenna 1611 may include one or more antennas or antenna arrays, configured to send and/or receive wireless signals, and is connected to interface 1614. In certain alternative embodiments, antenna 1611 may be separate from WD 1610 and be connectable to WD 1610 through an interface or port. Antenna 1611, interface 1614, and/or processing circuitry 1620 may be configured to perform any receiving or transmitting operations described herein as being performed by a WD. Any information, data and/or signals may be received from a network node and/or another WD. In some embodiments, radio front end circuitry and/or antenna 1611 may be considered an interface.

As illustrated, interface 1614 comprises radio front end circuitry 1612 and antenna 1611. Radio front end circuitry 1612 comprise one or more filters 1618 and amplifiers 1616. Radio front end circuitry 1614 is connected to antenna 1611 and processing circuitry 1620, and is configured to condition signals communicated between antenna 1611 and processing circuitry 1620. Radio front end circuitry 1612 may be coupled to or a part of antenna 1611. In some embodiments, WD 1610 may not include separate radio front end circuitry 1612; rather, processing circuitry 1620 may comprise radio front end circuitry and may be connected to antenna 1611. Similarly, in some embodiments, some or all of RF transceiver circuitry 1622 may be considered a part of interface 1614. Radio front end circuitry 1612 may receive digital data that is to be sent out to other network nodes or WDs via a wireless connection. Radio front end circuitry 1612 may convert the digital data into a radio signal having the appropriate channel and bandwidth parameters using a combination of filters 1618 and/or amplifiers 1616. The radio signal may then be transmitted via antenna 1611. Similarly, when receiving data, antenna 1611 may collect radio signals which are then converted into digital data by radio front end circuitry 1612. The digital data may be passed to processing circuitry 1620. In other embodiments, the interface may comprise different components and/or different combinations of components.

Processing circuitry 1620 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1610 components, such as device readable medium 1630, WD 1610 functionality. Such functionality may include providing any of the various wireless features or benefits discussed herein. For example, processing circuitry 1620 may execute instructions stored in device readable medium 1630 or in memory within processing circuitry 1620 to provide the functionality disclosed herein.

As illustrated, processing circuitry 1620 includes one or more of RF transceiver circuitry 1622, baseband processing circuitry 1624, and application processing circuitry 1626. In other embodiments, the processing circuitry may comprise different components and/or different combinations of components. In certain embodiments processing circuitry 1620 of WD 1610 may comprise a SOC. In some embodiments, RF transceiver circuitry 1622, baseband processing circuitry 1624, and application processing circuitry 1626 may be on separate chips or sets of chips. In alternative embodiments, part or all of baseband processing circuitry 1624 and application processing circuitry 1626 may be combined into one chip or set of chips, and RF transceiver circuitry 1622 may be on a separate chip or set of chips. In still alternative embodiments, part or all of RF transceiver circuitry 1622 and baseband processing circuitry 1624 may be on the same chip or set of chips, and application processing circuitry 1626 may be on a separate chip or set of chips. In yet other alternative embodiments, part or all of RF transceiver circuitry 1622, baseband processing circuitry 1624, and application processing circuitry 1626 may be combined in the same chip or set of chips. In some embodiments, RF transceiver circuitry 1622 may be a part of interface 1614. RF transceiver circuitry 1622 may condition RF signals for processing circuitry 1620.

In certain embodiments, some or all of the functionality described herein as being performed by a WD may be provided by processing circuitry 1620 executing instructions stored on device readable medium 1630, which in certain embodiments may be a computer-readable storage medium. In alternative embodiments, some or all of the functionality may be provided by processing circuitry 1620 without executing instructions stored on a separate or discrete device readable storage medium, such as in a hard-wired manner In any of those particular embodiments, whether executing instructions stored on a device readable storage medium or not, processing circuitry 1620 can be configured to perform the described functionality. The benefits provided by such functionality are not limited to processing circuitry 1620 alone or to other components of WD 1610, but are enjoyed by WD 1610 as a whole, and/or by end users and the wireless network generally.

Processing circuitry 1620 may be configured to perform any determining, calculating, or similar operations (e.g., certain obtaining operations) described herein as being performed by a WD. These operations, as performed by processing circuitry 1620, may include processing information obtained by processing circuitry 1620 by, for example, converting the obtained information into other information, comparing the obtained information or converted information to information stored by WD 1610, and/or performing one or more operations based on the obtained information or converted information, and as a result of said processing making a determination.

Device readable medium 1630 may be operable to store a computer program, software, an application including one or more of logic, rules, code, tables, etc. and/or other instructions capable of being executed by processing circuitry 1620. Device readable medium 1630 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1620. In some embodiments, processing circuitry 1620 and device readable medium 1630 may be considered to be integrated.

User interface equipment 1632 may provide components that allow for a human user to interact with WD 1610. Such interaction may be of many forms, such as visual, audial, tactile, etc. User interface equipment 1632 may be operable to produce output to the user and to allow the user to provide input to WD 1610. The type of interaction may vary depending on the type of user interface equipment 1632 installed in WD 1610. For example, if WD 1610 is a smart phone, the interaction may be via a touch screen; if WD 1610 is a smart meter, the interaction may be through a screen that provides usage (e.g., the number of gallons used) or a speaker that provides an audible alert (e.g., if smoke is detected). User interface equipment 1632 may include input interfaces, devices and circuits, and output interfaces, devices, and circuits. User interface equipment 1632 is configured to allow input of information into WD 1610, and is connected to processing circuitry 1620 to allow processing circuitry 1620 to process the input information. User interface equipment 1632 may include, for example, a microphone, a proximity or other sensor, keys/buttons, a touch display, one or more cameras, a USB port, or other input circuitry. User interface equipment 1632 is also configured to allow output of information from WD 1610, and to allow processing circuitry 1620 to output information from WD 1610. User interface equipment 1632 may include, for example, a speaker, a display, vibrating circuitry, a USB port, a headphone interface, or other output circuitry. Using one or more input and output interfaces, devices, and circuits, of user interface equipment 1632, WD 1610 may communicate with end users and/or the wireless network, and allow them to benefit from the functionality described herein.

Auxiliary equipment 1634 is operable to provide more specific functionality which may not be generally performed by WDs. This may comprise specialized sensors for doing measurements for various purposes, interfaces for additional types of communication such as wired communications etc. The inclusion and type of components of auxiliary equipment 1634 may vary depending on the embodiment and/or scenario.

Power source 1636 may, in some embodiments, be in the form of a battery or battery pack. Other types of power sources, such as an external power source (e.g., an electricity outlet), photovoltaic devices or power cells, may also be used. WD 1610 may further comprise power circuitry 1637 for delivering power from power source 1636 to the various parts of WD 1610 which need power from power source 1636 to carry out any functionality described or indicated herein. Power circuitry 1637 may in certain embodiments comprise power management circuitry. Power circuitry 1637 may additionally or alternatively be operable to receive power from an external power source; in which case WD 1610 may be connectable to the external power source (such as an electricity outlet) via input circuitry or an interface such as an electrical power cable. Power circuitry 1637 may also in certain embodiments be operable to deliver power from an external power source to power source 1636. This may be, for example, for the charging of power source 1636. Power circuitry 1637 may perform any formatting, converting, or other modification to the power from power source 1636 to make the power suitable for the respective components of WD 1610 to which power is supplied.

Figure 17:
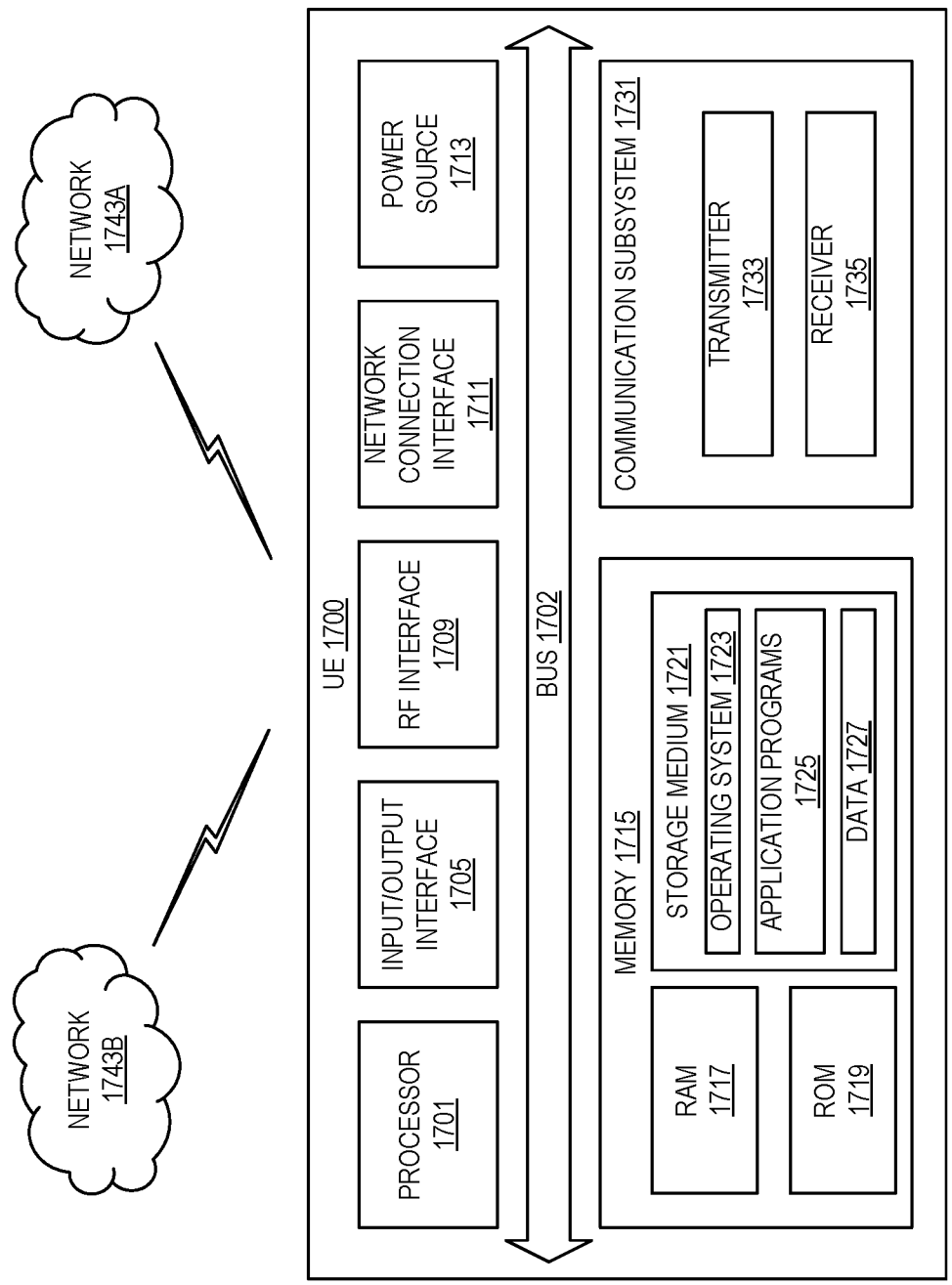
FIG. 17 illustrates one example of a UE.

FIG. 17 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 17200 may be any UE identified by the $3^{rd}$ Generation Partnership Project (3GPP), including a NB-IoT UE, a machine type communication (MTC) UE, and/or an enhanced MTC (eMTC) UE. UE 1700, as illustrated in FIG. 17, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 17 is a UE, the components discussed herein are equally applicable to a WD, and vice-versa.

In FIG. 17, UE 1700 includes processing circuitry 1701 that is operatively coupled to input/output interface 1705, radio frequency (RF) interface 1709, network connection interface 1711, memory 1715 including random access memory (RAM) 1717, read-only memory (ROM) 1719, and storage medium 1721 or the like, communication subsystem 1731, power source 1733, and/or any other component, or any combination thereof. Storage medium 1721 includes operating system 1723, application program 1725, and data 1727. In other embodiments, storage medium 1721 may include other similar types of information. Certain UEs may utilize all of the components shown in FIG. 17, or only a subset of the components. The level of integration between the components may vary from one UE to another UE. Further, certain UEs may contain multiple instances of a component, such as multiple processors, memories, transceivers, transmitters, receivers, etc.

In FIG. 17, processing circuitry 1701 may be configured to process computer instructions and data. Processing circuitry 1701 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1701 may include two central processing units (CPUs). Data may be information in a form suitable for use by a computer.

In the depicted embodiment, input/output interface 1705 may be configured to provide a communication interface to an input device, output device, or input and output device. UE 1700 may be configured to use an output device via input/output interface 1705. An output device may use the same type of interface port as an input device. For example, a USB port may be used to provide input to and output from UE 1700. The output device may be a speaker, a sound card, a video card, a display, a monitor, a printer, an actuator, an emitter, a smartcard, another output device, or any combination thereof. UE 1700 may be configured to use an input device via input/output interface 1705 to allow a user to capture information into UE 1700. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 17, RF interface 1709 may be configured to provide a communication interface to RF components such as a transmitter, a receiver, and an antenna. Network connection interface 1711 may be configured to provide a communication interface to network 1743a. Network 1743a may encompass wired and/or wireless networks such as a local-area network (LAN), a wide-area network (WAN), a computer network, a wireless network, a telecommunications network, another like network or any combination thereof. For example, network 1743a may comprise a Wi-Fi network. Network connection interface 1711 may be configured to include a receiver and a transmitter interface used to communicate with one or more other devices over a communication network according to one or more communication protocols, such as Ethernet, TCP/IP, SONET, ATM, or the like. Network connection interface 1711 may implement receiver and transmitter functionality appropriate to the communication network links (e.g., optical, electrical, and the like). The transmitter and receiver functions may share circuit components, software, or firmware, or alternatively may be implemented separately.

RAM 1717 may be configured to interface via bus 1702 to processing circuitry 1701 to provide storage or caching of data or computer instructions during the execution of software programs such as the operating system, application programs, and device drivers. ROM 1719 may be configured to provide computer instructions or data to processing circuitry 1701. For example, ROM 1719 may be configured to store invariant low-level system code or data for basic system functions such as basic input and output (I/O), startup, or reception of keystrokes from a keyboard that are stored in a non-volatile memory. Storage medium 1721 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1721 may be configured to include operating system 1723, application program 1725 such as a web browser application, a widget or gadget engine or another application, and data file 1727. Storage medium 1721 may store, for use by UE 1700, any of a variety of various operating systems or combinations of operating systems.

Storage medium 1721 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1721 may allow UE 1700 to access computer-executable instructions, application programs or the like, stored on transitory or non-transitory memory media, to off-load data, or to upload data. An article of manufacture, such as one utilizing a communication system may be tangibly embodied in storage medium 1721, which may comprise a device readable medium.

In FIG. 17, processing circuitry 1701 may be configured to communicate with network 1743*b* using communication subsystem 1731. Network 1743*a* and network 1743*b* may be the same network or networks or different network or networks. Communication subsystem 1731 may be configured to include one or more transceivers used to communicate with network 1743*b*. For example, communication subsystem 1731 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1733 and/or receiver 1735 to implement transmitter or receiver functionality, respectively, appropriate to the RAN links (e.g., frequency allocations and the like). Further, transmitter 1733 and receiver 1735 of each transceiver may share circuit components, software, or firmware, or alternatively may be implemented separately.

In the illustrated embodiment, the communication functions of communication subsystem 1731 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1731 may include cellular communication, Wi-Fi communication, Bluetooth communication, and GPS communication. Network 1743*b* may encompass wired and/or wireless networks such as a local-area network (LAN), a wide-area network (WAN), a computer network, a wireless network, a telecommunications network, another like network or any combination thereof. For example, network 1743*b* may be a cellular network, a Wi-Fi network, and/or a near-field network. Power source 1713 may be configured to provide alternating current (AC) or direct current (DC) power to components of UE 1700.

The features, benefits and/or functions described herein may be implemented in one of the components of UE 1700 or partitioned across multiple components of UE 1700. Further, the features, benefits, and/or functions described herein may be implemented in any combination of hardware, software, or firmware. In one example, communication subsystem 1731 may be configured to include any of the components described herein. Further, processing circuitry 1701 may be configured to communicate with any of such components over bus 1702. In another example, any of such components may be represented by program instructions stored in memory that when executed by processing circuitry 1701 perform the corresponding functions described herein. In another example, the functionality of any of such components may be partitioned between processing circuitry 1701 and communication subsystem 1731. In another example, the non-computationally intensive functions of any of such components may be implemented in software or firmware and the computationally intensive functions may be implemented in hardware.

Figure 18:
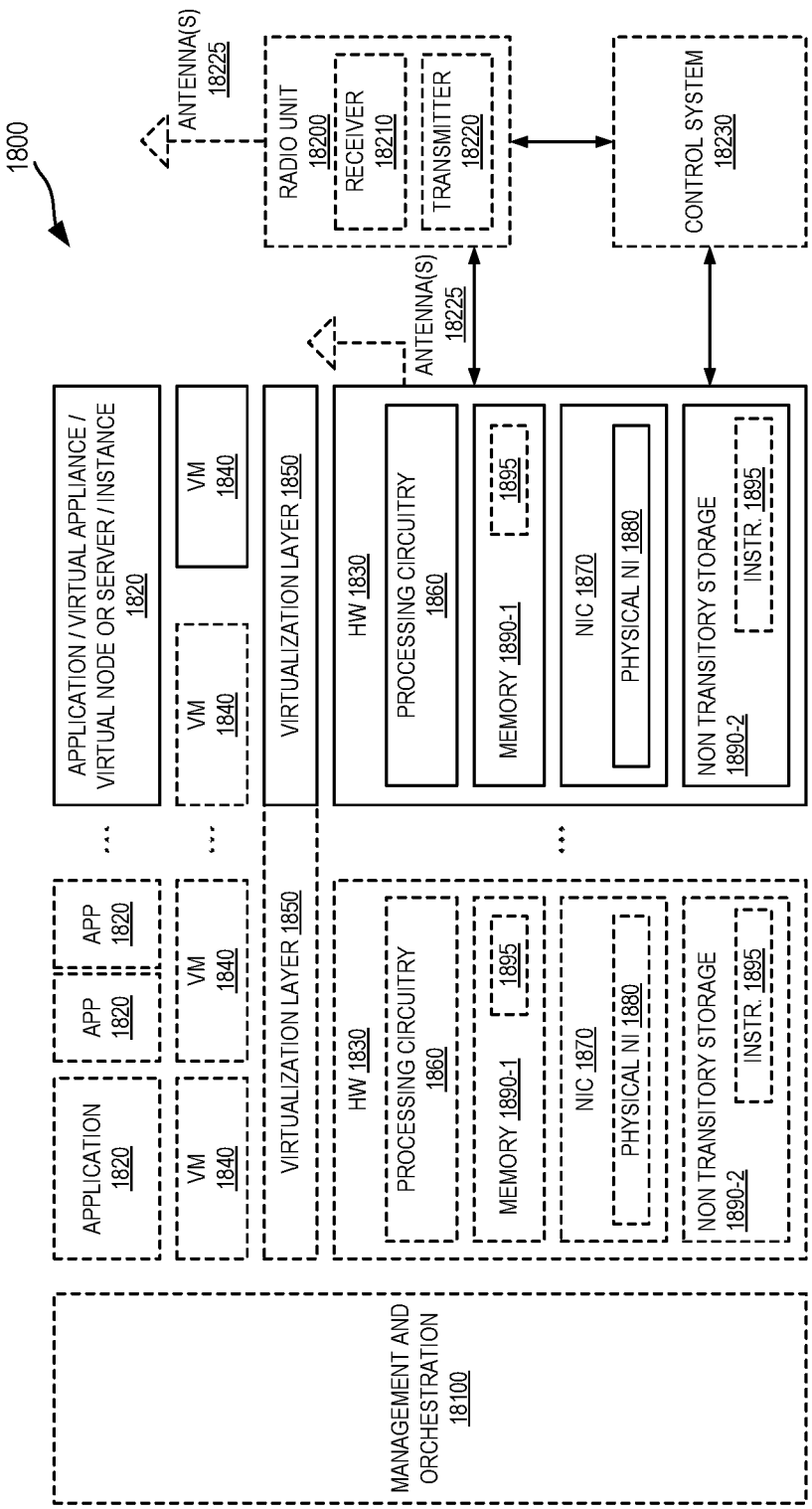
FIG. 18 illustrates one example of a virtualization environment in which functions implemented by some embodiments of the present disclosure may be virtualized.

FIG. 18 is a schematic block diagram illustrating a virtualization environment 1800 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1800 hosted by one or more of hardware nodes 1830. Further, in embodiments in which the virtual node is not a radio access node or does not require radio connectivity (e.g., a core network node), then the network node may be entirely virtualized.

The functions may be implemented by one or more applications 1820 (which may alternatively be called software instances, virtual appliances, network functions, virtual nodes, virtual network functions, etc.) operative to implement some of the features, functions, and/or benefits of some of the embodiments disclosed herein. Applications 1820 are run in virtualization environment 1800 which provides hardware 1830 comprising processing circuitry 1860 and memory 1890. Memory 1890 contains instructions 1895 executable by processing circuitry 1860 whereby application 1820 is operative to provide one or more of the features, benefits, and/or functions disclosed herein.

Virtualization environment 1800, comprises general-purpose or special-purpose network hardware devices 1830 comprising a set of one or more processors or processing circuitry 1860, which may be commercial off-the-shelf (COTS) processors, dedicated Application Specific Integrated Circuits (ASICs), or any other type of processing circuitry including digital or analog hardware components or special purpose processors. Each hardware device may comprise memory 1890-1 which may be non-persistent memory for temporarily storing instructions 1895 or software executed by processing circuitry 1860. Each hardware device may comprise one or more network interface controllers (NICs) 1870, also known as network interface cards, which include physical network interface 1880. Each hardware device may also include non-transitory, persistent, machine-readable storage media 1890-2 having stored therein software 1895 and/or instructions executable by processing circuitry 1860. Software 1895 may include any type of software including software for instantiating one or more virtualization layers 1850 (also referred to as hypervisors), software to execute virtual machines 1840 as well as software allowing it to execute functions, features and/or benefits described in relation with some embodiments described herein.

Virtual machines 1840, comprise virtual processing, virtual memory, virtual networking or interface and virtual storage, and may be run by a corresponding virtualization layer 1850 or hypervisor. Different embodiments of the instance of virtual appliance 1820 may be implemented on one or more of virtual machines 1840, and the implementations may be made in different ways.

During operation, processing circuitry 1860 executes software 1895 to instantiate the hypervisor or virtualization layer 1850, which may sometimes be referred to as a virtual machine monitor (VMM). Virtualization layer 1850 may present a virtual operating platform that appears like networking hardware to virtual machine 1840.

As shown in FIG. 18, hardware 1830 may be a standalone network node with generic or specific components. Hardware 1830 may comprise antenna 18225 and may implement some functions via virtualization. Alternatively, hardware 1830 may be part of a larger cluster of hardware (e.g., such as in a data center or customer premise equipment (CPE)) where many hardware nodes work together and are managed via management and orchestration (MANO) 18100, which, among others, oversees lifecycle management of applications 1820.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1840 may be a software implementation of a physical machine that runs programs as if they were executing on a physical, non-virtualized machine. Each of virtual machines 1840, and that part of hardware 1830 that executes that virtual machine, be it hardware dedicated to that virtual machine and/or hardware shared by that virtual machine with others of the virtual machines 1840, forms a separate virtual network elements (VNE).

Still in the context of NFV, Virtual Network Function (VNF) is responsible for handling specific network functions that run in one or more virtual machines 1840 on top of hardware networking infrastructure 1830 and corresponds to application 1820 in FIG. 18.

In some embodiments, one or more radio units 18200 that each include one or more transmitters 18220 and one or more receivers 18210 may be coupled to one or more antennas 18225. Radio units 18200 may communicate directly with hardware nodes 1830 via one or more appropriate network interfaces and may be used in combination with the virtual components to provide a virtual node with radio capabilities, such as a radio access node or a base station.

In some embodiments, some signaling can be effected with the use of control system 18230 which may alternatively be used for communication between the hardware nodes 1830 and radio units 18200.

Figure 19:
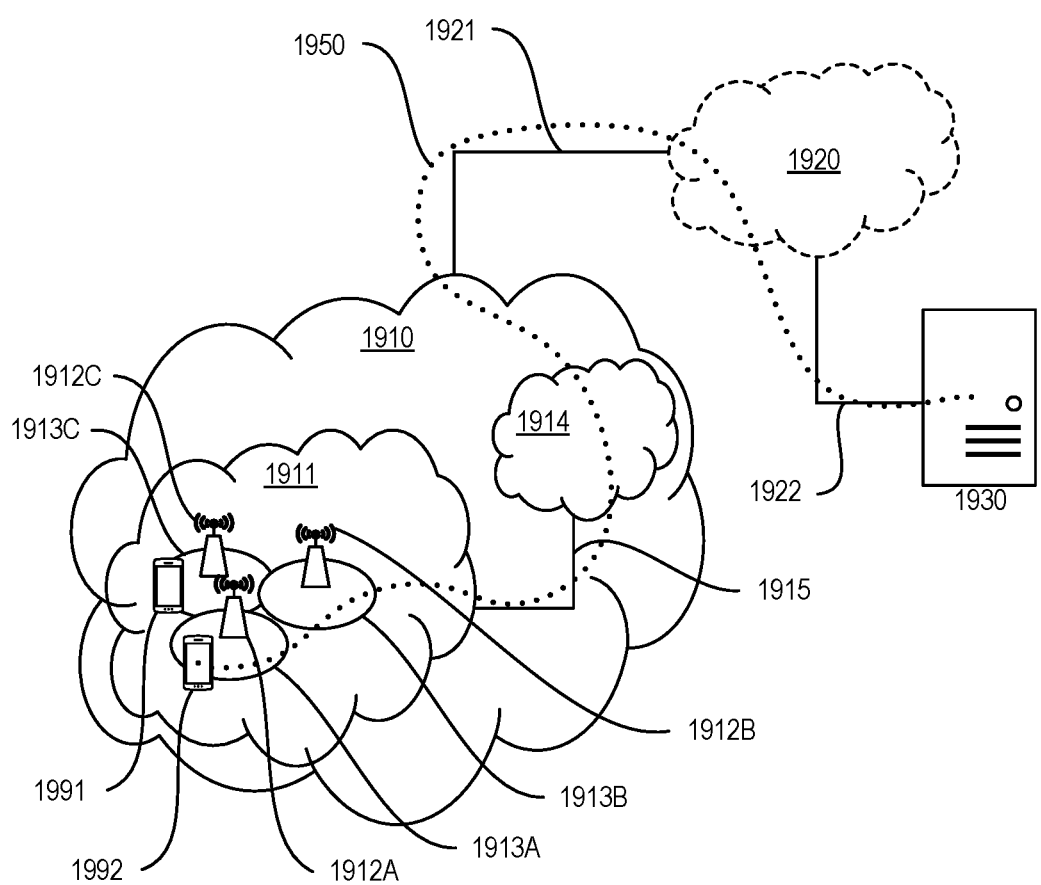
FIG. 19 illustrates an example embodiment of a communication system in which embodiments of the present disclosure may be implemented.

With reference to FIG. 19, in accordance with an embodiment, a communication system includes telecommunication network 1910, such as a 3GPP-type cellular network, which comprises access network 1911, such as a radio access network, and core network 1914. Access network 1911 comprises a plurality of base stations 1912*a*, 1912*b*, 1912*c*, such as NBs, eNBs, gNBs or other types of wireless access points, each defining a corresponding coverage area 1913*a*, 1913*b*, 1913*c*. Each base station 1912*a*, 1912*b*, 1912*c* is connectable to core network 1914 over a wired or wireless connection 1915. A first UE 1991 located in coverage area 1913*c* is configured to wirelessly connect to, or be paged by, the corresponding base station 1912*c*. A second UE 1992 in coverage area 1913*a* is wirelessly connectable to the corresponding base station 1912*a*. While a plurality of UEs 1991, 1992 are illustrated in this example, the disclosed embodiments are equally applicable to a situation where a sole UE is in the coverage area or where a sole UE is connecting to the corresponding base station 1912.

Telecommunication network 1910 is itself connected to host computer 1930, which may be embodied in the hardware and/or software of a standalone server, a cloud-implemented server, a distributed server or as processing resources in a server farm. Host computer 1930 may be under the ownership or control of a service provider, or may be operated by the service provider or on behalf of the service provider. Connections 1921 and 1922 between telecommunication network 1910 and host computer 1930 may extend directly from core network 1914 to host computer 1930 or may go via an optional intermediate network 1920. Intermediate network 1920 may be one of, or a combination of more than one of, a public, private or hosted network; intermediate network 1920, if any, may be a backbone network or the Internet; in particular, intermediate network 1920 may comprise two or more sub-networks (not shown).

The communication system of FIG. 19 as a whole enables connectivity between the connected UEs 1991, 1992 and host computer 1930. The connectivity may be described as an over-the-top (OTT) connection 1950. Host computer 1930 and the connected UEs 1991, 1992 are configured to communicate data and/or signaling via OTT connection 1950, using access network 1911, core network 1914, any intermediate network 1920 and possible further infrastructure (not shown) as intermediaries. OTT connection 1950 may be transparent in the sense that the participating communication devices through which OTT connection 1950 passes are unaware of routing of uplink and downlink communications. For example, base station 1912 may not or need not be informed about the past routing of an incoming downlink communication with data originating from host computer 1930 to be forwarded (e.g., handed over) to a connected UE 1991. Similarly, base station 1912 need not be aware of the future routing of an outgoing uplink communication originating from the UE 1991 towards the host computer 1930.

Example implementations, in accordance with an embodiment, of the UE, base station and host computer discussed in the preceding paragraphs will now be described with reference to FIG. 20. In communication system 2000, host computer 2010 comprises hardware 2015 including communication interface 2016 configured to set up and maintain a wired or wireless connection with an interface of a different communication device of communication system 2000. Host computer 2010 further comprises processing circuitry 2018, which may have storage and/or processing capabilities. In particular, processing circuitry 2018 may comprise one or more programmable processors, application-specific integrated circuits, field programmable gate arrays or combinations of these (not shown) adapted to execute instructions. Host computer 2010 further comprises software 2011, which is stored in or accessible by host computer 2010 and executable by processing circuitry 2018. Software 2011 includes host application 2012. Host application 2012 may be operable to provide a service to a remote user, such as UE 2030 connecting via OTT connection 2050 terminating at UE 2030 and host computer 2010. In providing the service to the remote user, host application 2012 may provide user data which is transmitted using OTT connection 2050.

Communication system 2000 further includes base station 2020 provided in a telecommunication system and comprising hardware 2025 enabling it to communicate with host computer 2010 and with UE 2030. Hardware 2025 may include communication interface 2026 for setting up and maintaining a wired or wireless connection with an interface of a different communication device of communication system 2000, as well as radio interface 2027 for setting up and maintaining at least wireless connection 2070 with UE 2030 located in a coverage area (not shown in FIG. 20) served by base station 2020. Communication interface 2026 may be configured to facilitate connection 2060 to host computer 2010. Connection 2060 may be direct or it may pass through a core network (not shown in FIG. 20) of the telecommunication system and/or through one or more intermediate networks outside the telecommunication system. In the embodiment shown, hardware 2025 of base station 2020 further includes processing circuitry 2028, which may comprise one or more programmable processors, application-specific integrated circuits, field programmable gate arrays or combinations of these (not shown) adapted to execute instructions. Base station 2020 further has software 2021 stored internally or accessible via an external connection.

Communication system 2000 further includes UE 2030 already referred to. Its hardware 2035 may include radio interface 2037 configured to set up and maintain wireless connection 2070 with a base station serving a coverage area in which UE 2030 is currently located. Hardware 2035 of UE 2030 further includes processing circuitry 2038, which may comprise one or more programmable processors, application-specific integrated circuits, field programmable gate arrays or combinations of these (not shown) adapted to execute instructions. UE 2030 further comprises software 2031, which is stored in or accessible by UE 2030 and executable by processing circuitry 2038. Software 2031 includes client application 2032. Client application 2032 may be operable to provide a service to a human or non-human user via UE 2030, with the support of host computer 2010. In host computer 2010, an executing host application 2012 may communicate with the executing client application 2032 via OTT connection 2050 terminating at UE 2030 and host computer 2010. In providing the service to the user, client application 2032 may receive request data from host application 2012 and provide user data in response to the request data. OTT connection 2050 may transfer both the request data and the user data. Client application 2032 may interact with the user to generate the user data that it provides.

Figure 20:
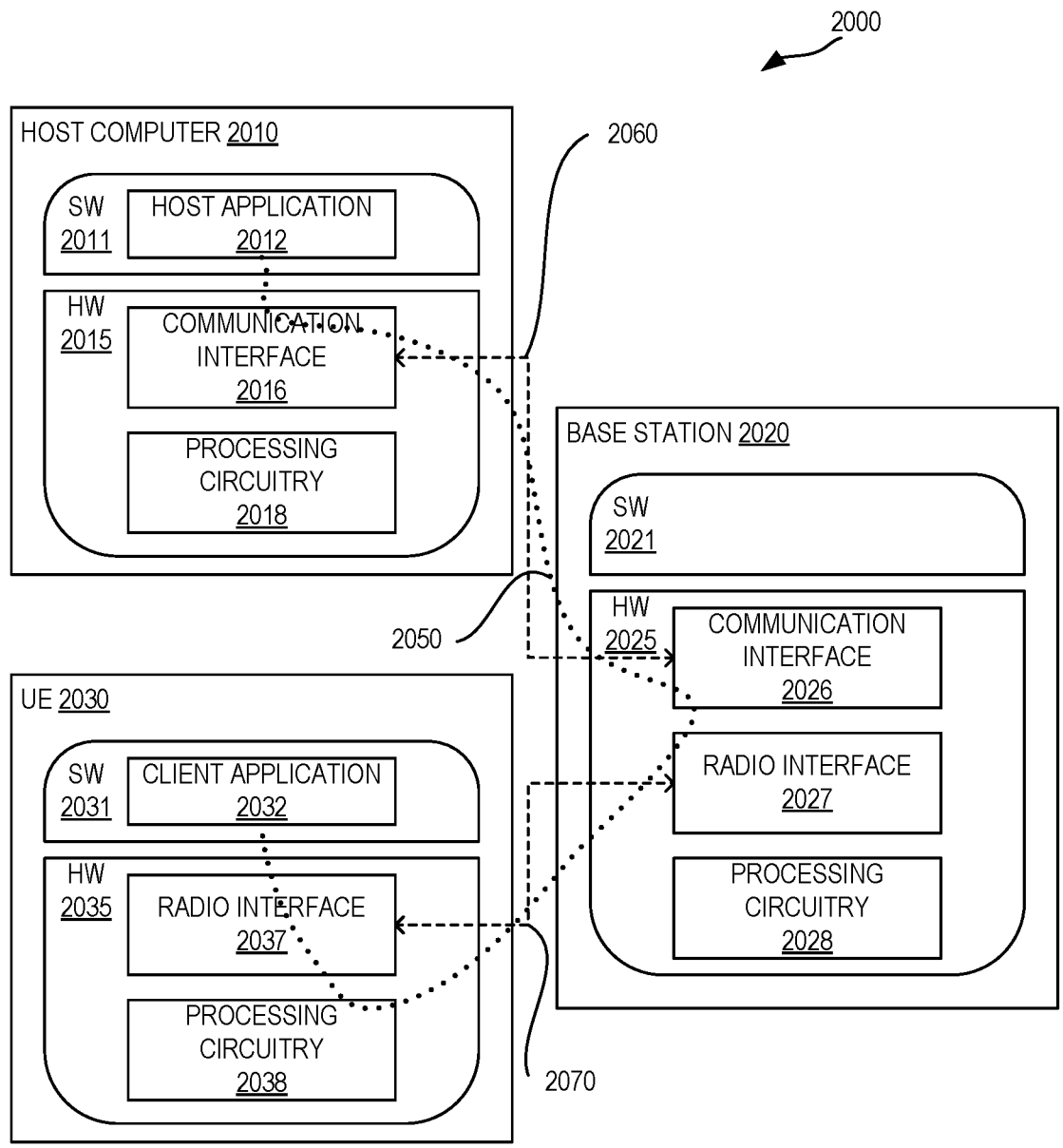
FIG. 20 illustrates example embodiments of the host computer, base station, and UE of FIG. 19.

It is noted that host computer 2010, base station 2020 and UE 2030 illustrated in FIG. 20 may be similar or identical to host computer 1930, one of base stations 1912*a*, 1912*b*, 1912*c* and one of UEs 1991, 1992 of FIG. 19, respectively. This is to say, the inner workings of these entities may be as shown in FIG. 20 and independently, the surrounding network topology may be that of FIG. 19.

In FIG. 20, OTT connection 2050 has been drawn abstractly to illustrate the communication between host computer 2010 and UE 2030 via base station 2020, without explicit reference to any intermediary devices and the precise routing of messages via these devices. Network infrastructure may determine the routing, which it may be configured to hide from UE 2030 or from the service provider operating host computer 2010, or both. While OTT connection 2050 is active, the network infrastructure may further take decisions by which it dynamically changes the routing (e.g., on the basis of load balancing consideration or reconfiguration of the network).

Wireless connection 2070 between UE 2030 and base station 2020 is in accordance with the teachings of the embodiments described throughout this disclosure. One or more of the various embodiments improve the performance of OTT services provided to UE 2030 using OTT connection 2050, in which wireless connection 2070 forms the last segment. More precisely, the teachings of these embodiments may improve the data rate, latency, and/or power consumption and thereby provide benefits such as e.g., reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring OTT connection 2050 between host computer 2010 and UE 2030, in response to variations in the measurement results. The measurement procedure and/or the network functionality for reconfiguring OTT connection 2050 may be implemented in software 2011 and hardware 2015 of host computer 2010 or in software 2031 and hardware 2035 of UE 2030, or both. In embodiments, sensors (not shown) may be deployed in or in association with communication devices through which OTT connection 2050 passes; the sensors may participate in the measurement procedure by supplying values of the monitored quantities exemplified above, or supplying values of other physical quantities from which software 2011, 2031 may compute or estimate the monitored quantities. The reconfiguring of OTT connection 2050 may include message format, retransmission settings, preferred routing etc.; the reconfiguring need not affect base station 2020, and it may be unknown or imperceptible to base station 2020. Such procedures and functionalities may be known and practiced in the art. In certain embodiments, measurements may involve proprietary UE signaling facilitating host computer 2010's measurements of throughput, propagation times, latency and the like. The measurements may be implemented in that software 2011 and 2031 causes messages to be transmitted, in particular empty or 'dummy' messages, using OTT connection 2050 while it monitors propagation times, errors etc.

Figures 21, 22:
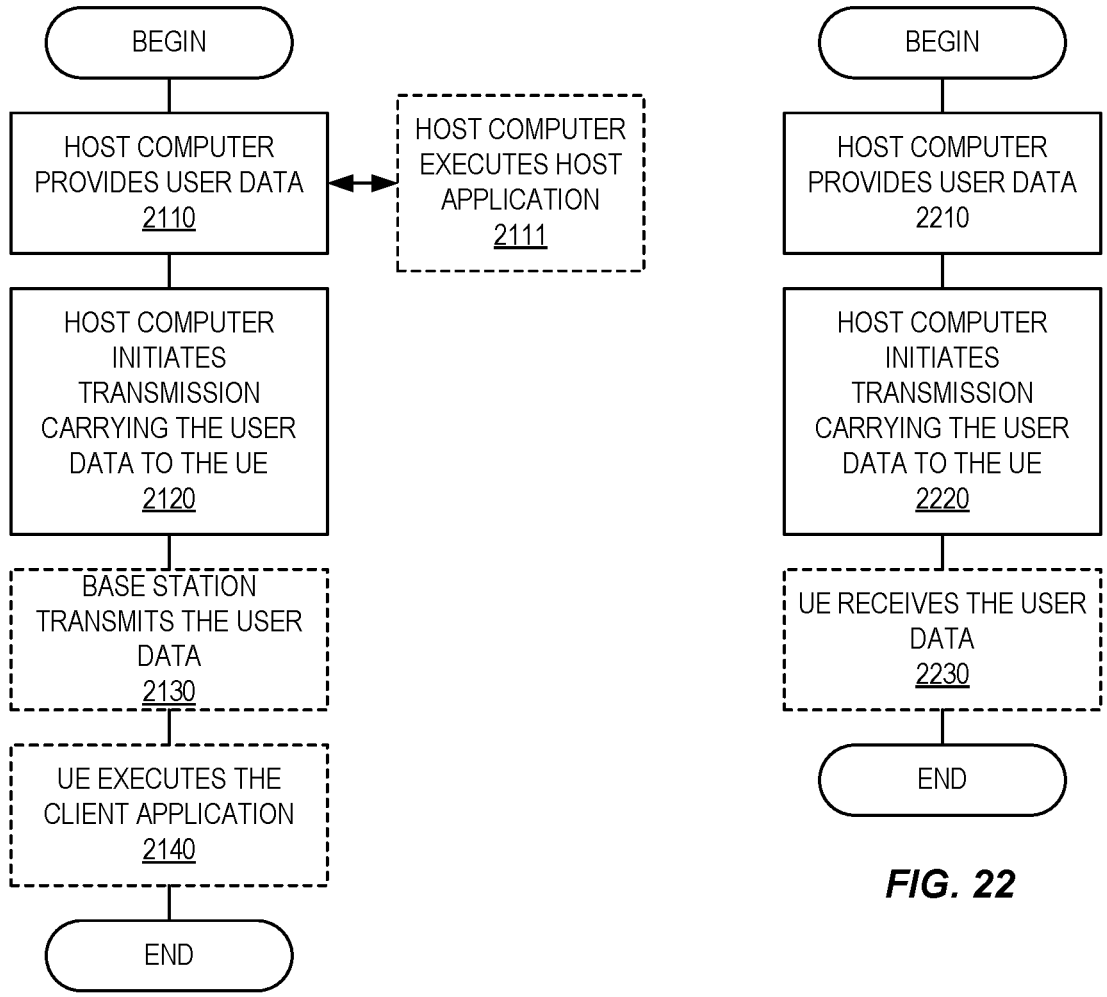
FIGS. 21 through 24 are flow charts that illustrate example embodiments of methods implemented in a communication system such as that of FIG. 19.

FIG. 21 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 21 will be included in this section. In step 2110, the host computer provides user data. In substep 2111 (which may be optional) of step 2110, the host computer provides the user data by executing a host application. In step 2120, the host computer initiates a transmission carrying the user data to the UE. In step 2130 (which may be optional), the base station transmits to the UE the user data which was carried in the transmission that the host computer initiated, in accordance with the teachings of the embodiments described throughout this disclosure. In step 2140 (which may also be optional), the UE executes a client application associated with the host application executed by the host computer.

FIG. 22 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 22 will be included in this section. In step 2210 of the method, the host computer provides user data. In an optional substep (not shown) the host computer provides the user data by executing a host application. In step 2220, the host computer initiates a transmission carrying the user data to the UE. The transmission may pass via the base station, in accordance with the teachings of the embodiments described throughout this disclosure. In step 2230 (which may be optional), the UE receives the user data carried in the transmission.

Figures 23, 24:
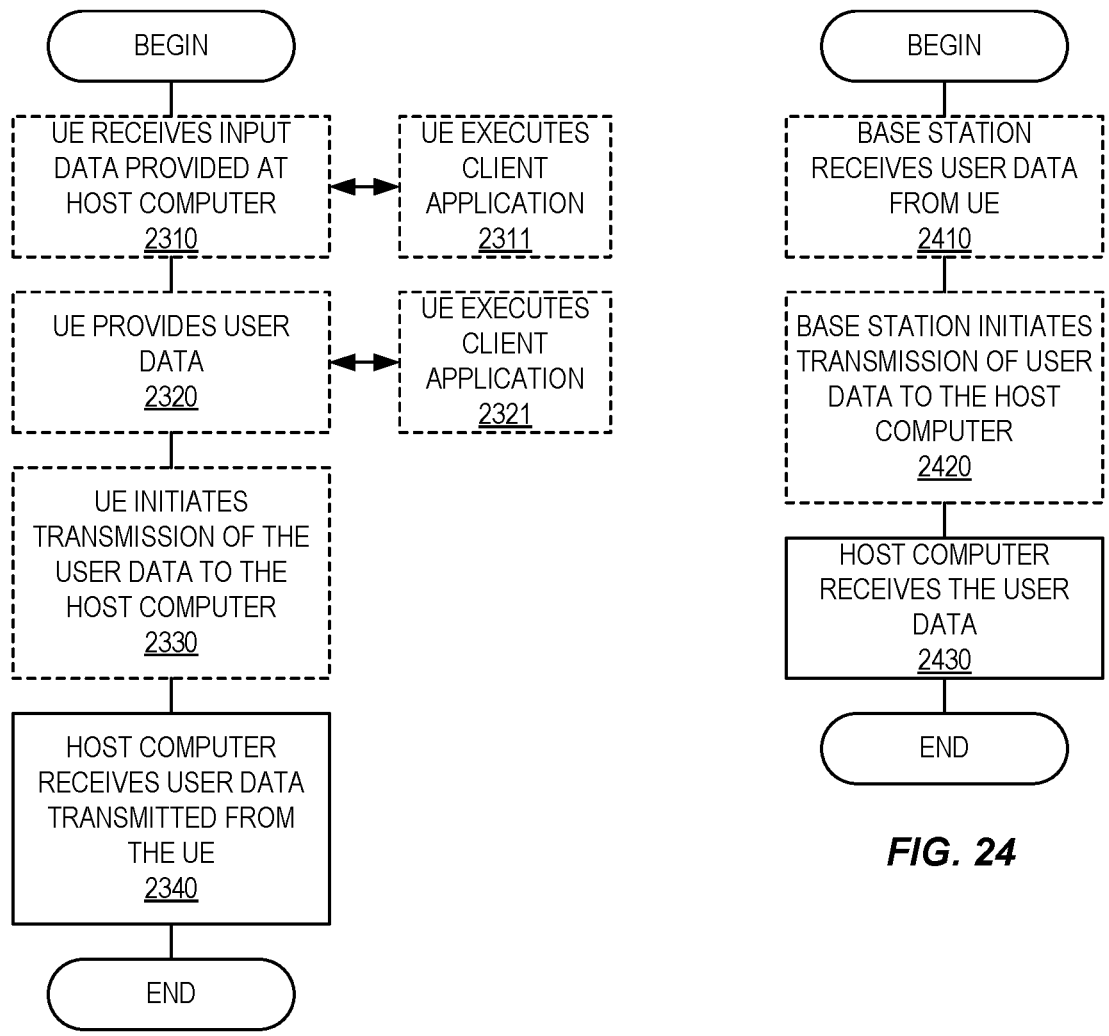

FIG. 23 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 23 will be included in this section. In step 2310 (which may be optional), the UE receives input data provided by the host computer. Additionally or alternatively, in step 2320, the UE provides user data. In substep 2321 (which may be optional) of step 2320, the UE provides the user data by executing a client application. In substep 2311 (which may be optional) of step 2310, the UE executes a client application which provides the user data in reaction to the received input data provided by the host computer. In providing the user data, the executed client application may further consider user input received from the user. Regardless of the specific manner in which the user data was provided, the UE initiates, in substep 2330 (which may be optional), transmission of the user data to the host computer. In step 2340 of the method, the host computer receives the user data transmitted from the UE, in accordance with the teachings of the embodiments described throughout this disclosure.

FIG. 24 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 24 will be included in this section. In step 2410 (which may be optional), in accordance with the teachings of the embodiments described throughout this disclosure, the base station receives user data from the UE. In step 2420 (which may be optional), the base station initiates transmission of the received user data to the host computer. In step 2430 (which may be optional), the host computer receives the user data carried in the transmission initiated by the base station. Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Some example embodiments of the present disclosure are as follows:

Embodiment 1: A method performed by a base station operating as a master node (MN) for conditional PSCell change upon secondary node (SN) release, the method comprising:
determining to release a secondary node (SN) for a wireless device (UE) operating in multi-radio dual connectivity mode (MR-DC) and configured with conditional PSCell change (CPC);
transmitting an SN Node Release Request message to the Source SN (S-SN);
receiving an SN Node Release Acknowledge message from the S-SN;
determining whether the SN Node Release Acknowledge message triggers a cancel procedure for the CPC towards a target candidate SN (T-SN) associated with a CPC configuration; and
in response to determining whether a cancellation procedure is triggered, determinizing whether to indicate to the UE that the CPC is to be removed.

Embodiment 2: The method of embodiment 1, wherein determining whether the SN Node Release Acknowledge message triggers a cancel procedure for the CPC towards a target candidate SN (T-SN) associated with a CPC configuration comprises determining whether the UE is configured with CPC and a configured target candidate is associated with another network node or the same network node.

Embodiment 3: The method of embodiment 2, and further comprising triggering a CPC cancel procedure towards a target candidate SN (T-SN) associated with a CPC configuration if the configured target candidate is associated with another network node.

Embodiment 4: The method of embodiment 2, and further comprising refraining from triggering a CPC cancel procedure if the UE is configured with the CPC and a configured target candidate is associated to the same network node.

Embodiment 5: The method of embodiment 1, and further comprising generating an RRCReconfiguration message releasing the CPC if the CPC is an MN-related or MCG configuration and the MN has triggered a cancel procedure towards a target candidate SN.

Embodiment 6: The method of embodiment 1, and further comprising generating an RRCReconfiguration message including an indication for the SCG release if the CPC is an SN-related/SCG configuration and the MN has triggered a cancel procedure towards a target candidate SN.

Embodiment 7: A method performed by a base station operating as a source secondary node (S-SN) for conditional PSCell change upon secondary node (SN) release, the method comprising receiving an SN Node Release Request message from a master node (MN) and transmitting the SN Node Release Request Acknowledge message to the MN.

Embodiment 8: A method performed by a base station operating as a source secondary node (S-SN) for conditional PSCell change upon secondary node (SN) release, the method comprising:
    determining to release a SN a for a wireless device (UE) operating in multi-radio dual connectivity mode (MR-DC) and configured with conditional PSCell change (CPC);
    transmitting an SN Node Release Required message to a master node (MN); and
    receiving an SN Node Release Confirm message from the MN.

Embodiment 9: A method performed at a base station operating as a master node (MN) for conditional PSCell change (CPC) upon secondary node (SN) release, the method comprising:
    receiving an SN Node Release Required message from a source secondary node (S-SN);
    in response to the received SN Node Release Required message, transmitting an SN Node Release Confirm message to the S-SN;
    determining whether the received SN Node Release Required message triggers a CPC cancel procedure towards a target candidate SN (T-SN) associated with a CPC configuration; and
    determining whether to indicate an associated wireless device that the CPC is to be removed.

Embodiment 10: The method of embodiment 9, and further comprising triggering CPC cancel procedure towards a target candidate SN (T-SN) associated with a CPC configuration if the UE is configured with the CPC and a configured target candidate is associated with another network node.

Embodiment 11: The method of embodiment 10, and further comprising refraining from triggering a CPC cancel procedure if the UE is configured with the CPC and a configured target candidate is associated with the same network node the MN.

Embodiment 12: The method of embodiment 10, and further comprising generating an RRCReconfiguration message releasing CPC if CPC is an MN-related or MCG configuration and the MN has triggered a cancel procedure towards a target candidate SN.

Embodiment 13: The method of embodiment 10, and further comprising generating an RRCReconfiguration message including an indication for an SCG release if the CPC is an SN-related/SCG configuration and the MN has triggered a cancel procedure towards a target candidate SN.

Embodiment 14: The method of any of the previous embodiments, further comprising: obtaining user data; and forwarding the user data to a host computer or a wireless device.

Embodiment 15: A base station for conditional PSCell change (CPC) upon secondary node (SN) release the base station comprising processing circuitry configured to perform any of the steps of any of embodiments 1 to 13, and power supply circuitry configured to supply power to the base station.

Embodiment 16: A communication system including a host computer comprising: processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of embodiments 1 to 13.

Embodiment 17: The communication system of the previous embodiment further including the base station.

Embodiment 18: The communication system of the previous 2 embodiments, further including the UE, wherein the UE is configured to communicate with the base station.

Embodiment 19: The communication system of the previous 3 embodiments, wherein: the processing circuitry of the host computer is configured to execute a host application, thereby providing the user data; and the UE comprises processing circuitry configured to execute a client application associated with the host application.

Embodiment 20: A method implemented in a communication system including a host computer, a base station and a user equipment (UE), the method comprising: at the host computer, providing user data; and at the host computer, initiating a transmission carrying the user data to the UE via a cellular network comprising the base station, wherein the base station performs any of embodiments 1 to 13.

Embodiment 21: The method of the previous embodiment, further comprising, at the base station, transmitting the user data.

Embodiment 22: The method of the previous 2 embodiments, wherein the user data is provided at the host computer by executing a host application, the method further comprising, at the UE, executing a client application associated with the host application.

Embodiment 23: A user equipment (UE) configured to communicate with a base station, the UE comprising a radio interface and processing circuitry configured to performs the of the previous 3 embodiments.

Embodiment 24: The communication system of the previous embodiment, wherein the cellular network further includes a base station configured to communicate with the UE.

Embodiment 25: The communication system of the previous 2 embodiments, wherein: the processing circuitry of the host computer is configured to execute a host application, thereby providing the user data; and the UE's processing circuitry is configured to execute a client application associated with the host application.

Embodiment 26: The method of the previous embodiment, further comprising at the UE, receiving the user data from the base station.

Embodiment 27: The communication system of the previous embodiment, further including the UE.

Embodiment 28: The communication system of the previous 2 embodiments, further including the base station, wherein the base station comprises a radio interface configured to communicate with the UE and a communication interface configured to forward to the host computer the user data carried by a transmission from the UE to the base station.

Embodiment 29: The communication system of the previous 3 embodiments, wherein: the processing circuitry of the host computer is configured to execute a host application; and the UE's processing circuitry is configured to execute a client application associated with the host application, thereby providing the user data.

Embodiment 30: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 31: A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of embodiments 1 to 13.

Embodiment 32: The communication system of the previous embodiment further including the base station.

Embodiment 33: The communication system of the previous 2 embodiments, further including the UE, wherein the UE is configured to communicate with the base station.

Embodiment 34: The communication system of the previous 3 embodiments, wherein: the processing circuitry of the host computer is configured to execute a host application; the UE is configured to execute a client application associated with the host application, thereby providing the user data to be received by the host computer.

The invention claimed is:

1. A method performed by a Master Node (MN) for Secondary Node (SN) release for a User Equipment (UE) that is operating in Multi-Radio Dual Connectivity MR-DC and configured with Conditional Primary Secondary Cell (PSCell) Change (CPC), the method comprising:
   determining that the SN for the UE that is operating in MR-DC and configured with the CPC is to be released; and
   responsive to determining that the SN for the UE that is operating in MR-DC and configured with the CPC is to be released:
     sending a first message to a target SN (T-SN) associated with a CPC configuration for the UE, the first message being indicative of a CPC cancellation; and
     sending a second message to the UE, the second message comprising an explicit or implicit indication that the UE is to release the CPC configuration.

2. The method of claim 1, wherein determining that the SN for the UE that is operating in MR-DC and configured with the CPC is to be released comprises determining, by the MN, to release the SN node for the UE that is operating in MR-DC and configured with the CPC.

3. The method of claim 1, wherein determining that the SN for the UE that is operating in MR-DC and configured with the CPC is to be released comprises receiving a request to release the SN node for the UE that is operating in MR-DC and configured with the CPC.

4. The method of claim 3, further comprising:
   responsive to determining for the UE that is operating in MR-DC and configured with the CPC is to be released, determining whether a CPC cancellation procedure towards the T-SN associated with the CPC configuration of the UE is to be performed;
   wherein sending the first message and sending the second message are performed responsive to determining that the SN for the UE that is operating in MR-DC and configured with the CPC is to be released and determining that the CPC cancellation procedure towards the T-SN associated with the CPC configuration of the UE is to be performed.

5. The method of claim 4, wherein determining whether the CPC cancellation procedure towards the T-SN associated with the CPC configuration of the UE is to be performed comprises determining whether the UE is configured with the CPC and whether a target candidate PSCell is associated with a same network node as the SN being released or with a different network node than the SN being released.

6. The method of claim 4, wherein determining whether the CPC cancellation procedure towards the T-SN associated with the CPC configuration of the UE is to be performed further comprises determining that the CPC cancellation procedure towards the T-SN is to be performed responsive to determining that the UE is configured with the CPC and the target candidate PSCell is associated with the different network node than the SN being released.

7. The method of claim 1, wherein sending the first message to the T-SN comprises sending the first message to the T-SN prior to sending a SN release request to the SN being released.

8. The method of claim 1, wherein sending the first message to the T-SN comprises sending the first message to the T-SN subsequent to sending a SN release request to the SN being released.

9. The method of claim 1, wherein the first message is a new CPC cancel message.

10. The method of claim 1, wherein the first message is a SN release request or a SN modification request.

11. The method of claim 1, wherein the first message comprises a cause value that indicates that a cause of the first message is the SN release.

12. The method of claim 1, wherein the second message is a Radio Resource Control (RRC) reconfiguration message.

13. The method of claim 12, wherein the CPC configuration of the UE is a SN-generated CPC configuration, and the RRC reconfiguration message comprises field mrdc-SecondaryCellGroupConfig set to release.

14. The method of claim 12, wherein the CPC configuration of the UE is a MN-generated CPC configuration, and release of the CPC configuration at the UE results in release of one or more measurement objects that are only associated to the CPC configuration being released.

15. The method of claim 12, wherein the CPC configuration of the UE is a MN-generated CPC configuration, and the RRC reconfiguration message comprises a list of conditional reconfigurations to remove that comprises an indication of the CPC configuration being released.

16. A method performed by a candidate target Secondary Node T-SN) for Conditional Primary Secondary Cell (PSCell), Change (CPC) for a User Equipment (UE) that is operating in Multi-Radio Dual Connectivity (MR-DC) and configured with the CPC, the method comprising:

receiving, from a Master Node (MN) of the UE that is operating in MR-DC and configured with the CPC, a first message that is indicative of a CPC cancellation for the CPC for the UE; and releasing a CPC configuration for the UE at the candidate T-SN responsive to receiving the first message.

17. The method of claim 16, wherein the first message is a new CPC cancel message.

18. The method of claim 16, wherein the first message is a SN release request or a SN modification request.

19. A method performed by a User Equipment (UE) that is operating in Multi-Radio Dual Connectivity (MR-DC), the method comprising:

obtaining a Conditional Primary Secondary Cell PSCell) Change (CPC) configuration;

monitoring for an occurrence of one or more conditions defined for the CPC configuration; and receiving, from a Master Node (MN), a message that implicitly or explicitly indicates that the CPC configuration is to be released;

wherein the message that implicitly or explicitly indicates that the CPC configuration is to be released is received in association with a release of a Secondary Node (SN) of the UE.

20. The method of claim 19, wherein the message is a Radio Resource Control (RRC) reconfiguration message.

\* \* \* \* \*